(12) United States Patent
Tanaka

(10) Patent No.: US 6,325,040 B1
(45) Date of Patent: Dec. 4, 2001

(54) CYLINDER DIRECT INJECTION ENGINE

(75) Inventor: Keiji Tanaka, Shizuoka-ken (JP)

(73) Assignee: Suzuki Motor Corporation, Shizuoka-ken (JP)

( * ) Notice: Subject to any disclaimer, the term of this patent is extended or adjusted under 35 U.S.C. 154(b) by 0 days.

(21) Appl. No.: 09/516,676

(22) Filed: Mar. 1, 2000

(30) Foreign Application Priority Data

Mar. 2, 1999 (JP) .................................................. 11-054288

(51) Int. Cl.$^7$ ............................................................ F02B 3/00
(52) U.S. Cl. .................................................. 123/294; 123/305
(58) Field of Search ................................. 123/294, 305, 123/27 R

(56) References Cited

U.S. PATENT DOCUMENTS 5,720,253   2/1998   Matoba et al. .

FOREIGN PATENT DOCUMENTS

| 7-217478 | 8/1995 | (JP) . |
| 9-144543 | 6/1997 | (JP) . |
| 10-288127 | 10/1998 | (JP) . |
| 10-339145 | 12/1998 | (JP) . |

*Primary Examiner*—John Kwon
(74) *Attorney, Agent, or Firm*—Flynn, Thiel, Boutell & Tanis, P.C.

(57) ABSTRACT

A cylinder direct injection engine designed for stable combustion wherein a difference in size between a piston stroke and a cylinder bore ranges from 0% to 4%, and the piston stroke is greater than the cylinder bore when the difference is unequal to 0%. The cylinder direct injection engine can also have a 50 mm to 80 mm piston stroke, a 50 mm to 92 mm cylinder bore, and a 0.8 to 1.4 stroke-bore ratio or a cylinder bore set to be less than 85 mm with respect to a 15° to 90° cone angle of fuel jetting in a conical stream pattern from the injector.

3 Claims, 32 Drawing Sheets

RELATIONSHIP BETWEEN CYLINDER
BORE AND SCUFFING

| CYLINDER BORE (mm) | SCUFFING |
|---|---|
| 40 | OCCURRENCE |
| 45 | OCCURRENCE |
| 50 | ABSENCE |
| 55 | ABSENCE |
| 60 | ABSENCE |

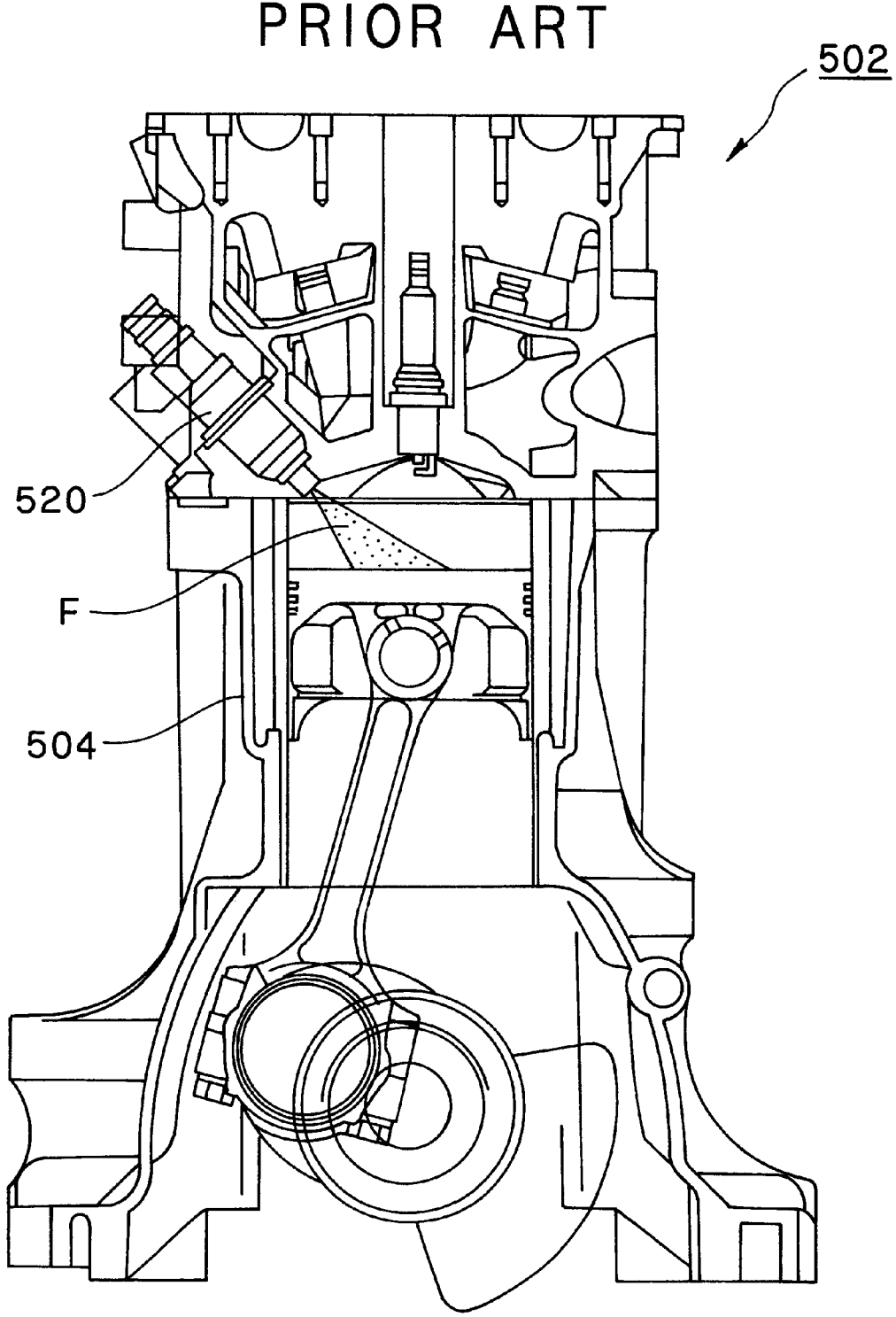

FIG.35(a)
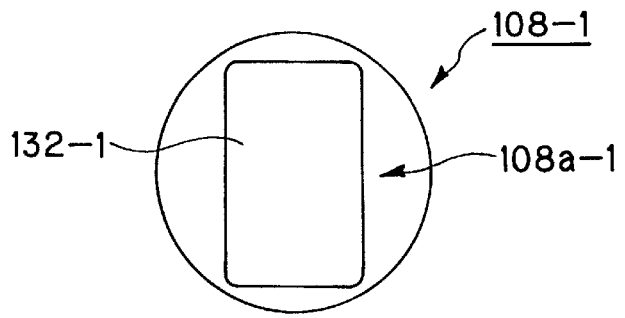
FIG.35(b)
FIG.35(c)
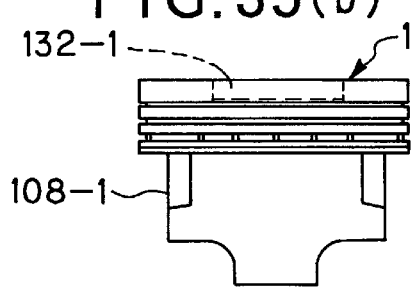
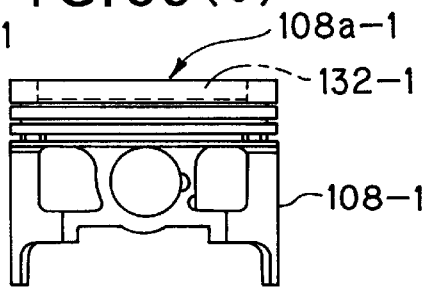
FIG.36(a)
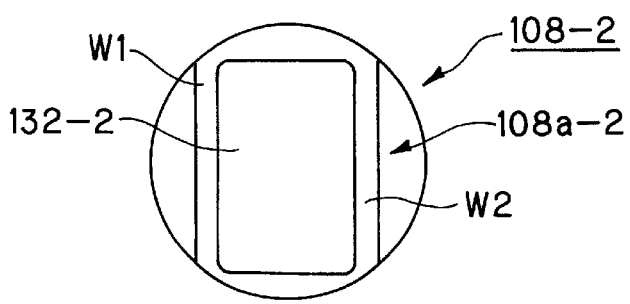
FIG.36(b)
FIG.36(c)
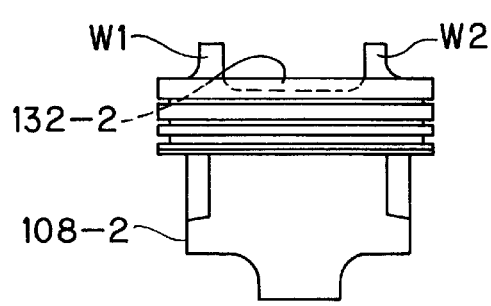
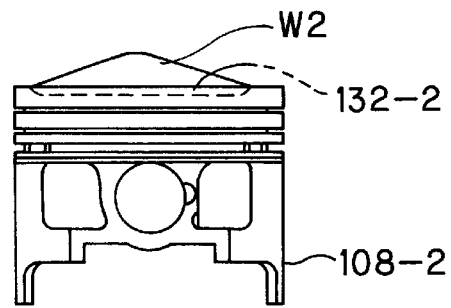

FIG. 37(a)
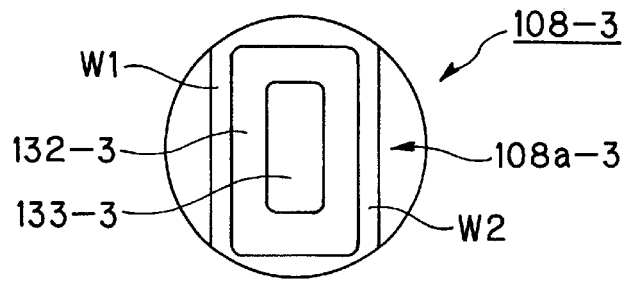
FIG. 37(b)      FIG. 37(c)
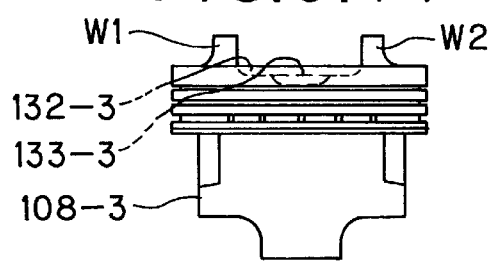  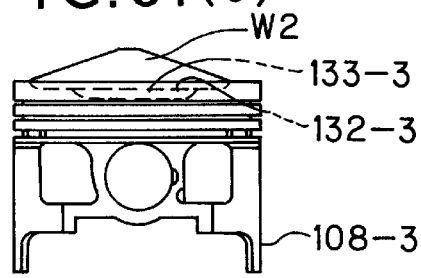
FIG. 38(a)
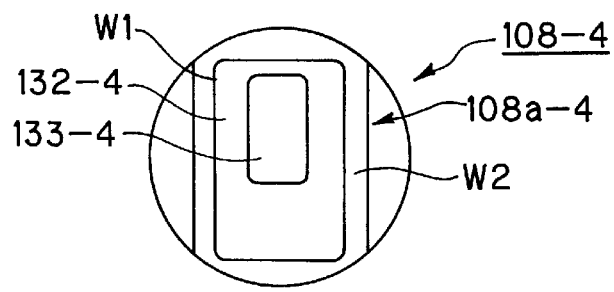
FIG. 38(b)      FIG. 38(c)
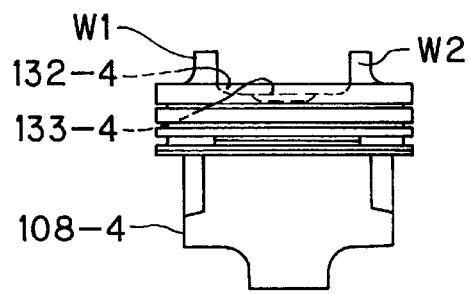  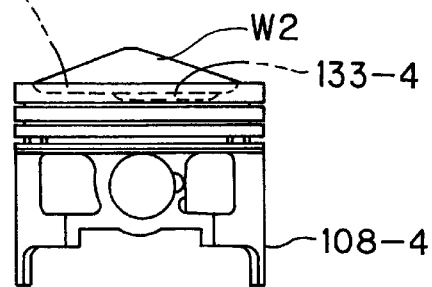

CYLINDER DIRECT INJECTION ENGINE

FIELD OF THE INVENTION

This invention relates to a cylinder direct injection engine and, more particularly, to a cylinder direct injection engine designed for stable combustion.

BACKGROUND OF THE INVENTION

Some engines disposed in a vehicle are of a type called a cylinder direct injection engine. This type of an engine has a spark plug provided in a cylinder head at a substantially central portion of a combustion chamber. The combustion chamber is formed between the underside of the cylinder head and a top surface of a piston. In addition, intake and exhaust valves are disposed in the cylinder head. The intake valve is positioned on one side of the cylinder head, but the exhaust valve is located on the other side thereof. Further, an injector is disposed in the cylinder head on one side thereof. The injector expels fuel in the form of a conical stream onto the top surface of the piston.

One such example of a cylinder direct injection engine is disclosed in published Japanese Patent Application Laid-Open No. 7-217478. A fuel injection controller for use in a spark ignition engine of a cylinder injection type as disclosed in this publication controls knocking without detracting from fuel efficiency when the knocking occurs.

Another example is disclosed in published Japanese Patent Application Laid-Open No. 9-144543. A direct injection spark ignition internal combustion engine as disclosed in this publication has a spark plug disposed at a substantially central portion of a combustion chamber. In addition, an intake port is positioned offset from the axis of a cylinder. Further, a fuel injection valve is provided at a depression angle ($\theta=30°\pm10°$) at the intake port adjacent to an opening of the combustion chamber in such a manner that cone angle $\alpha$ of fuel spray is set to be $70°\pm20°$. This construction provides improved engine performance.

A further example is disclosed in published Japanese Patent Application Laid-Open No. 10-288127. In a combustion chamber of an internal combustion engine as disclosed in this publication, a concave portion is provided on a cylinder head wall surface on the side of a spark plug near a nozzle aperture of a fuel injection valve. When the fuel injection valve discharges fuel therefrom under atmospheric pressure conditions outside the combustion chamber, then a first angle $\theta 1$ is defined between a central axis defined by the fuel spray and a peripheral surface of the fuel spray. In this state, a second angle $\theta$ defined between a slanted wall surface at the concave portion and the conical surface of the fuel spray is set to be greater than the first angle $\theta 1$. The conical surface of the fuel spray defines first angle $\theta 1$ with respect to the central axis of the fuel spray from the fuel injection valve after the same is fitted to the combustion chamber. Such a construction restrains or minimizes the occurrence of an attractive force, which otherwise would attract atomized fuel to the cylinder head wall surface. In addition, fuel is combusted in a stable manner, which results in a reduced amount of soot.

A further example is disclosed in published Japanese Patent Application Laid-Open No. 10-339145. A cylinder direct injection type of a spark ignition engine as disclosed in this publication includes a swirl control valve for imparting swirl to intake air that enters a cylinder through an intake port. Further, a pattern of atomized fuel driven out of an injector is set to have a hollow, conical shape that is in a state of initial atomization. In addition, a cap portion of a piston is formed with a cavity that is dented so as to receive the atomized fuel. This structure provides a combustion chamber adapted for this type of an engine.

A cylinder direct injection engine heretofore employed is designed to inject fuel directly into a combustion chamber from an injector during a compression stroke, thereby forming a stratified air-fuel mixture. For this reason, a large number of improvements in a piston pattern have been made.

However, injection timing of the injector as well as a piston phase influence the formation of the stratified mixture. In addition, the injection timing is limited to a narrow range.

FIG. 26 illustrates a cylinder direct injection engine (hereinafter simply called an "engine") 102. The engine 102 has a 75 mm cylinder bore and a 90 mm piston stroke. FIG. 27 is a cross-sectional view, showing a spark plug portion of the engine 102 in a 30° crank angle (CA) BTDC (Before Top Dead Center) state. FIG. 28 is a cross-sectional view, illustrating the spark plug portion of the engine 102 in a 45° crank angle (CA) BTDC state. FIG. 29 is a cross-sectional view, illustrating the spark plug portion of the engine 102 in a 60° crank angle (CA) BTDC state.

The engine 102 has a piston 108 disposed in a cylinder block 104 for reciprocation therein. In addition, a concave area 132 is defined at a top surface 108a of the piston 108.

The piston 108 is connected to a crankshaft (not shown) through a connecting rod (not shown). A combustion chamber 116 is formed between the underside of a cylinder head 106 and the top surface 108a. The cylinder head 106 is positioned on an upper surface of the cylinder block 104. A spark plug 118 is provided in the cylinder head 106 at a substantially central portion of the combustion chamber 116. An injector 120 is located in the cylinder head 106 on the intake side of the cylinder head 106. The injector 120 permits fuel to be expelled therefrom in the form of a conical stream directly into the combustion chamber 116.

The injector 120 injects the fuel therefrom into the concave area 132 during a second half of the compression stroke. At this time, atomized fuel "F" (FIG. 27) is captured at the concave area 132, and is then collected near the spark plug 118. Such collected fuel "F" forms a stratified mixture in cooperation with a lean mixture that surrounds the stratified mixture.

A certain period of time for the fuel to be atomized must be maintained between fuel injection and ignition. Such a period of time has requirements that vary, depending upon engine speed and engine load (i.e. a longer period of time between injection and ignition elapses for lower loads and speeds, and a shorter period of time between injection and ignition elapses for higher loads and speeds). Typically, ignition timing covers a range between a 30° and a 60° crank angle (CA) BTDC.

In the disclosed engine 102, however, the 60° crank angle (CA) BTDC as illustrated in FIG. 29 results in an improper positional relationship between the concave area 132 and the atomized fuel "F". This causes inconveniences of insufficient fuel capture, unsatisfactory stratification, and unstable combustion, which are all disadvantageous in view of practical use.

FIG. 30 discloses an engine 202 having a reduced-diameter cylinder bore. In the engine 202, a greater portion of atomized fuel "F" is shown adhered to a cylinder wall inside a cylinder block 204. This undesirable condition leads to scuffing which is caused by oil film deposited on a wall surface of the cylinder block 204, which is disadvantageous in view of practical use.

FIG. 31 illustrates another cylinder direct injection engine 302 heretofore employed. In this engine 302, fuel is injected from an injector 320 during a compression stroke, and is then delivered to a location near a spark plug 318 by means of a tumble flow (or swirl flow), thereby forming a stratified mixture.

At this time, when a piston stroke is small or short, then the tumble flow (or swirl flow) is reduced in strength, with a concomitant deficiency in fuel delivery. This brings about yet further inconveniences of an unsuccessful stratified mixture and thus unstable combustion.

Moreover, when the cylinder bore is too large (in diameter) in each of the above-described engines, except for the engine having the reduced cylinder bore of FIG. 30, a still further convenience is encountered. More specifically, as illustrated in FIG. 32, a richer mixture gathered near a spark plug 418 of an engine 402 and a leaner mixture surrounding the richer mixture are distributed incompletely, which results in unstable combustion.

In the above engine 402, when a stroke-bore ratio is extremely great or small (see FIG. 33), then there occurs yet another inconvenience in that flame is spread in a non-uniform fashion during combustion, with consequential unstable combustion.

FIG. 34 shows a cylinder direct injection engine 502 having a 30° cone angle, a 82 mm cylinder bore of a cylinder block 504, and a 45° injector installation angle of an injector 520.

In the engine 502 constructed according to the above settings, atomized fuel "F" jetting from the injector 520 during an intake stroke is spread in a combustion chamber due to various factors such as energy during fuel injection, fuel reflection on a top surface of a piston, fuel reflection on a cylinder wall, a flow of air, and fuel vaporization due to receipt of heat. However, since the cylinder bore diameter is excessively large with respect to the cone angle, then atomized fuel "F" is insufficiently spread in the combustion chamber, even when the spark plug is ignited. Such insufficient fuel dispersion causes still further inconveniences in that an air-fuel mixture is distributed in a non-uniform manner, with ensuing unstable combustion.

Just for reference, various configurations or patterns of the concave area 132 formed at the top surface 108a of the piston 108 are illustrated in FIGS. 35–38.

A piston 108-1 as shown in FIGS. 35(a)–35(c) has a rectangular-shaped concave area 132-1 formed on a top surface 108a-1 thereof. The concave area 132-1 extends from the intake side to the exhaust side.

A piston 108-2 as shown in FIGS. 36(a)–36(c) has a rectangular-shaped concave area 132-2 formed on a top surface 108a-2 thereof. The concave area 132-2 extends from the intake side to the exhaust side. In addition, protruding wall portions W1, W2 are formed at both ends of the concave area 132-2 in a direction between the intake side and the exhaust side. The protruding wall portions W1, W2 project in an upward direction from the piston 108-2, and thereby define a depth of the concave area 132-2.

A piston 108-3 as shown in FIGS. 37(a)–37(c) has a rectangular-shaped first concave area 132-3 defined on a top surface 108a-3 thereof. The first concave area 132-3 extends from the intake side to the exhaust side. In addition, protruding wall portions W1, W2 are formed at both ends of the first concave area 132-3 in a direction between the intake side and the exhaust side. The protruding wall portions W1, W2 project upwardly from the piston 108-3, and thereby define the depth of the first concave area 132-3. Further, a rectangular-shaped second concave area 133-3 is formed at a central portion of the first concave area 132-3. The second concave area 133-3 extends from the intake side to the exhaust side.

A piston 108-4 as shown in FIGS. 38(a)–38(c) has a rectangular-shaped first concave area 132-4 defined on a top surface 108a-4 thereof. The first concave area 132-4 extends from the intake side to the exhaust side. In addition, protruding wall portions W1, W2 are formed at both ends of the first concave area 132-4 in a direction between the intake side and the exhaust side. The protruding wall portions W1, W2 project upwardly from the piston 108-4, and thereby define a depth of the first concave area 132-4. Further, a rectangular-shaped second concave area 133-4 is formed on the first concave area 132-4 adjacent the exhaust side thereof. The second concave area 133-4 extends from the intake side to the exhaust side.

In order to obviate or at least minimize the above-described inconveniences, one aspect of the present invention provides a cylinder direct injection engine including a spark plug positioned in a cylinder head at a substantially central portion of a combustion chamber, the combustion chamber being formed between the underside of the cylinder head and a top surface of a piston, intake and exhaust valves disposed in the cylinder head on opposite sides thereof, and an injector provided in the cylinder head on one side of the cylinder head for injecting fuel in the form of a conical stream onto the top surface of the piston, wherein a difference in size between a piston stroke and a cylinder bore diameter ranges from about 0% to about 4%, and the piston stroke is greater than the cylinder bore when the difference is unequal to 0%.

Another aspect of the present invention provides a cylinder direct injection engine including a spark plug positioned in a cylinder head at a substantially central portion of a combustion chamber, the combustion chamber being formed between the underside of the cylinder head and a top surface of a piston, intake and exhaust valves disposed in the cylinder head on opposite sides thereof and an injector provided in the cylinder head on one side of the cylinder head for injecting fuel in the form of a conical stream onto the top surface of the piston, the improvement wherein the engine has a piston stroke of about 50 mm to about 80 mm, cylinder bore diameter of about 50 mm to about 92 mm, and a stroke-bore ratio of about 0.8 to about 1.4.

A further aspect of the present invention provides a cylinder direct injection engine including a spark plug positioned in a cylinder head at a substantially central portion of a combustion chamber, the combustion chamber being formed between the underside of the cylinder head and a top surface of a piston, intake and exhaust valves disposed in the cylinder head on opposite sides thereof and an injector provided in the cylinder head on one side of the cylinder head for injecting fuel in the form of a conical stream onto the top surface of the piston, wherein a cylinder bore diameter is set to be less than about 85 mm with respect to a cone angle of about 15° to about 90° of fuel injected in a conical stream pattern from the injector.

As discussed above, the cylinder direct injection engine according to one aspect of the present invention is constructed in such a manner that a difference in size between the piston stroke and the cylinder bore diameter ranges from about 0% to about 4%, and the piston stroke is greater than the cylinder bore when the difference is unequal to 0%. This construction provides a reduced amount of displacement of the piston with respect to a crank rotational angle, and thus an ideal stratified mixture during compression stroke injection in a wider range. As a result, fuel is combusted in a stable manner.

In addition, the cylinder direct injection engine according to another aspect of the present invention is configured to have a 50 to 80 mm piston stroke, a 50 to 92 mm cylinder bore, and a 0.8 to 1.4 stroke-bore ratio. Such a construction is possible to prevent scuffing, and thus to provide stable combustion.

Further, the cylinder direct injection engine according to a further aspect of the invention is configured to have the cylinder bore set to be less than 85 mm with respect to the 15° to 90° cone angle of fuel expelled in the form of a conical stream from the injector. Such a construction stabilizes combustion.

BRIEF DESCRIPTION OF THE DRAWINGS

Embodiments of the present invention will now be described with reference to the drawings.

FIG. 3(*b*) is a front view of the FIG. 3(*a*) piston;

FIG. 3(*c*) is a longitudinal cross-sectional view of the FIG. 3(*a*) piston;

FIG. 24(*b*) is a front view of the FIG. 24(*a*) piston;

FIG. 34 is a cross-sectional view, illustrating a spark plug portion of a cylinder direct injection engine having a 30° cone angle, a 82 mm cylinder bore, and a 45° injector installation angle according to a third known construction;

FIG. 35(*a*) is a plan view, showing a first example of a piston;

FIG. 35(*b*) is a front view of the FIG. 35(*a*) piston;

FIG. 35(*c*) is a right side view of the FIG. 35(*a*) example of the piston;

FIG. 36(*a*) is a plan view showing a second example of a piston;

FIG. 36(*b*) is a front view of the FIG. 36(*a*) piston;

FIG. 36(*c*) is a right side view of the FIG. 36(*a*) piston;

FIG. 37(*a*) is a plan view showing a third example of a piston;

FIG. 37(*b*) is a front view of the FIG. 37(*a*) piston;

FIG. 37(*c*) is a right side view of the FIG. 37(*a*) piston;

FIG. 38(*a*) is a plan view showing a fourth example of a piston;

FIG. 38(*b*) is a front view of the FIG. 38(*a*) piston; and

FIG. 38(*c*) is a right side view of the FIG. 38(*a*) piston.

DETAILED DESCRIPTION

Figure 1:
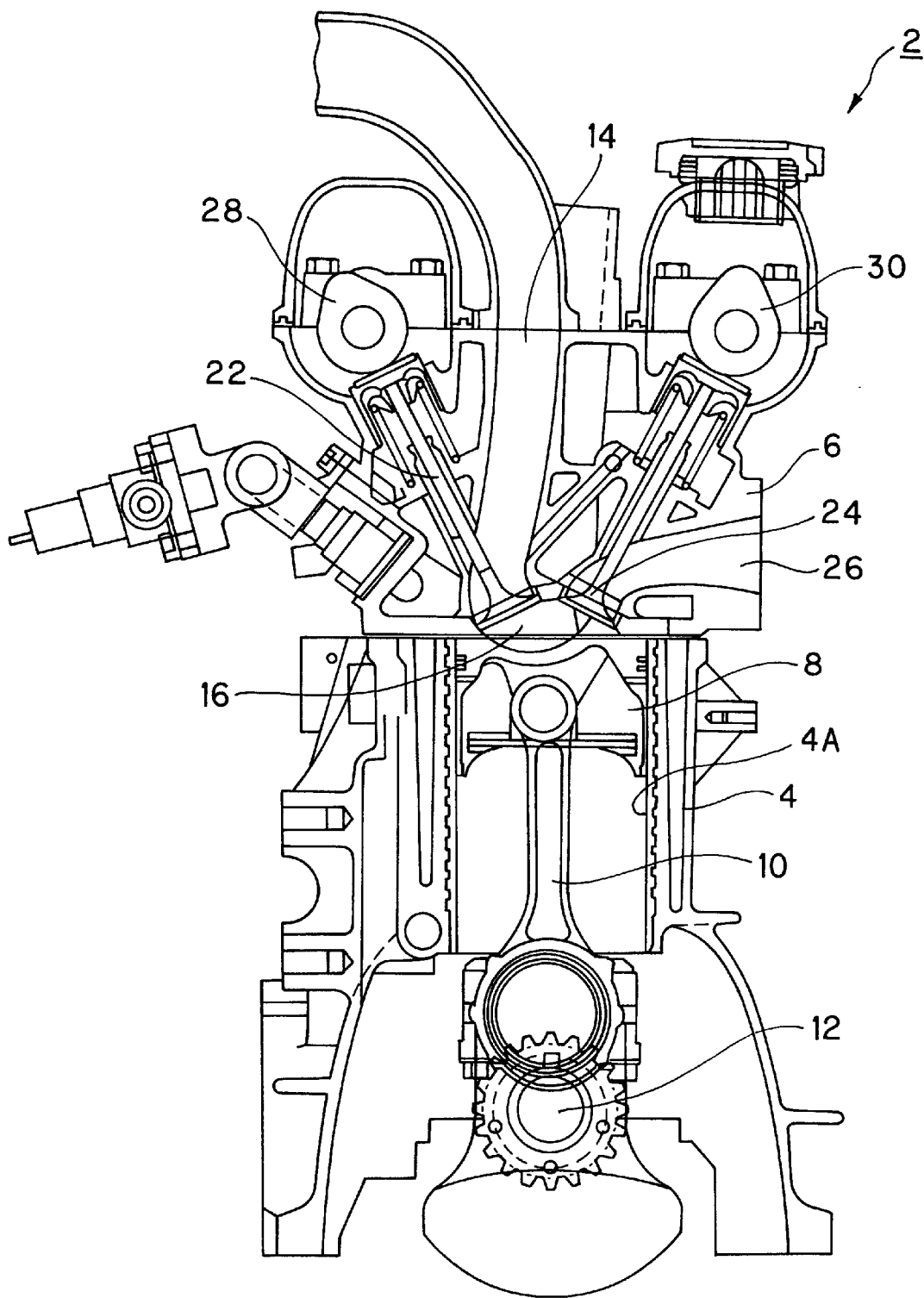
FIG. 1 is a cross-sectional view, illustrating a valve portion of a cylinder direct injection engine of a square type according to a first embodiment of the present invention.
Figure 2:
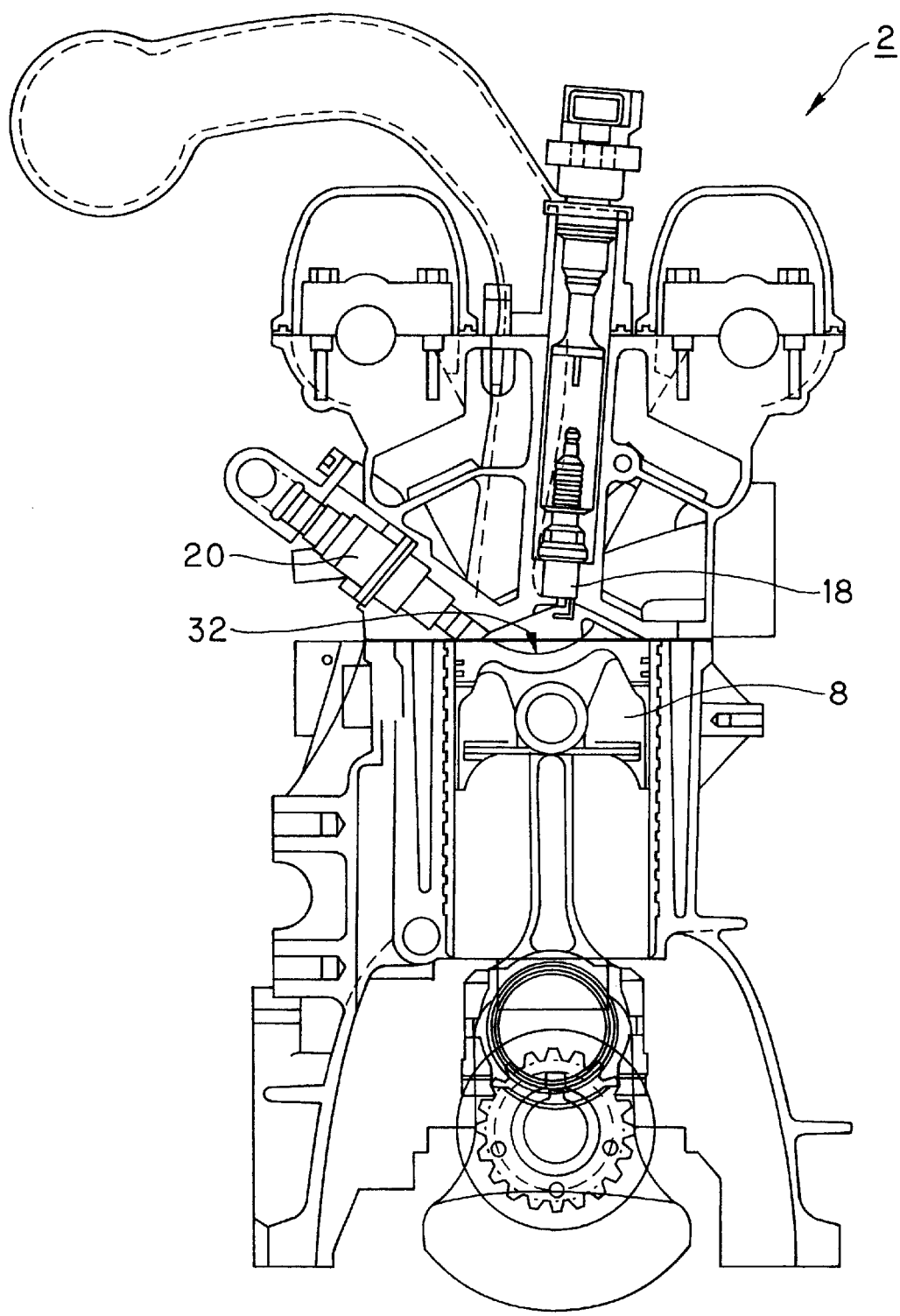
FIG. 2 is a cross-sectional view, illustrating a spark plug portion of the FIG. 1 engine.

FIGS. 1–12 illustrate a first embodiment. In FIGS. 1 and 2, reference numeral 2 denotes a cylinder direct injection engine (hereinafter simply called an "engine"); 4 a cylinder block; and 6 a cylinder head. The engine 2 includes the cylinder block 4 and the cylinder head 6 disposed on a top surface of the cylinder block 4. The cylinder block 4 houses a piston 8 for reciprocation within a cylinder bore 4A. The piston 8 is connected to a crankshaft 12 through a connecting rod 10. In addition, an intake port 14 is provided through an upper portion of the cylinder head 6.

Figure 3A:
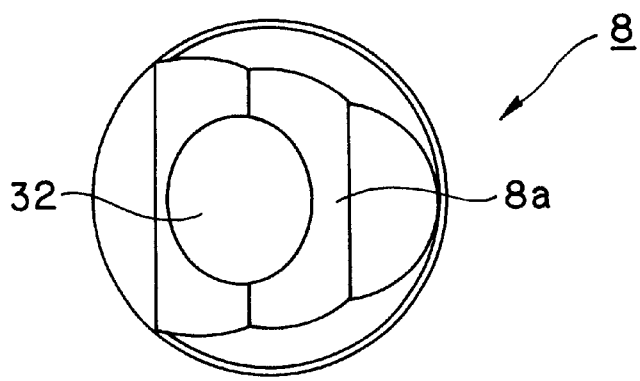
FIG. 3(*a*) is a plan view, showing a piston.
Figure 3B:
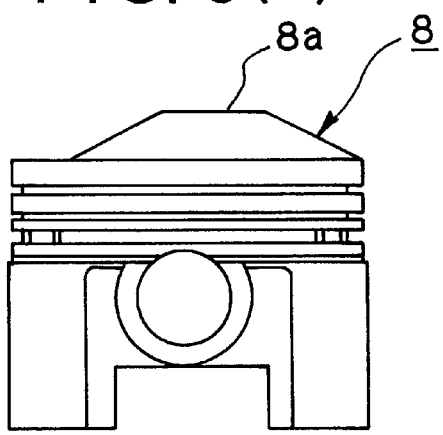
Figure 3C:
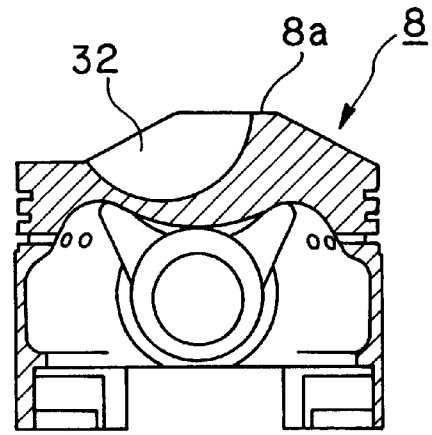

Further, a combustion chamber 16 is formed between the underside of the cylinder head 6 and a top surface 8*a* (FIGS. 3(*a*)–3(*c*)) of the piston 8. A spark plug 18 is provided in the cylinder head 6 at a substantially central portion of the combustion chamber 16. An injector 20 is disposed in the cylinder head 6 on the intake side thereof for injecting fuel in the form of a conical stream directly into the combustion chamber 16.

The cylinder head 6 also includes an intake valve 22 and an exhaust valve 24. The intake valve 22 is located on one side of the cylinder head 6, and the exhaust valve 24 is positioned on the other side thereof. In this regard, reference numeral 26 denotes an exhaust port; 28 an intake cam for driving the intake valve 22; and 30 an exhaust cam for driving the exhaust valve 24.

A substantially hemispherical concave area 32 is defined in the top part of the piston 8 (FIGS. 3(*a*)–3(*c*)). The concave area 32 is oriented in a slap direction which links the intake and exhaust valves 22, 24 together. As illustrated in FIGS. 3(*a*)–3(*c*), in order to form the concave area 32, the top surface 8*a* is offset toward the exhaust side from the intake side, and then the concave area 32 is defined on such offset top surface 8*a*.

Further, in the engine 2, a difference in size between a piston stroke (i.e. length) and a cylinder bore diameter ranges from 0% to 4%, and the piston stroke is greater than the cylinder bore diameter when the difference is unequal to 0%.

More specifically, the engine 2 is configured to cover a range from a square type in which the piston stroke is equal in size to the cylinder bore diameter to another in which the piston stroke is greater than the cylinder bore diameter by an amount of 4% or less. Therefore, the engine 2 may be, e.g., of a square type having a 75 mm cylinder bore and a 75 mm piston stroke.

Figure 7:
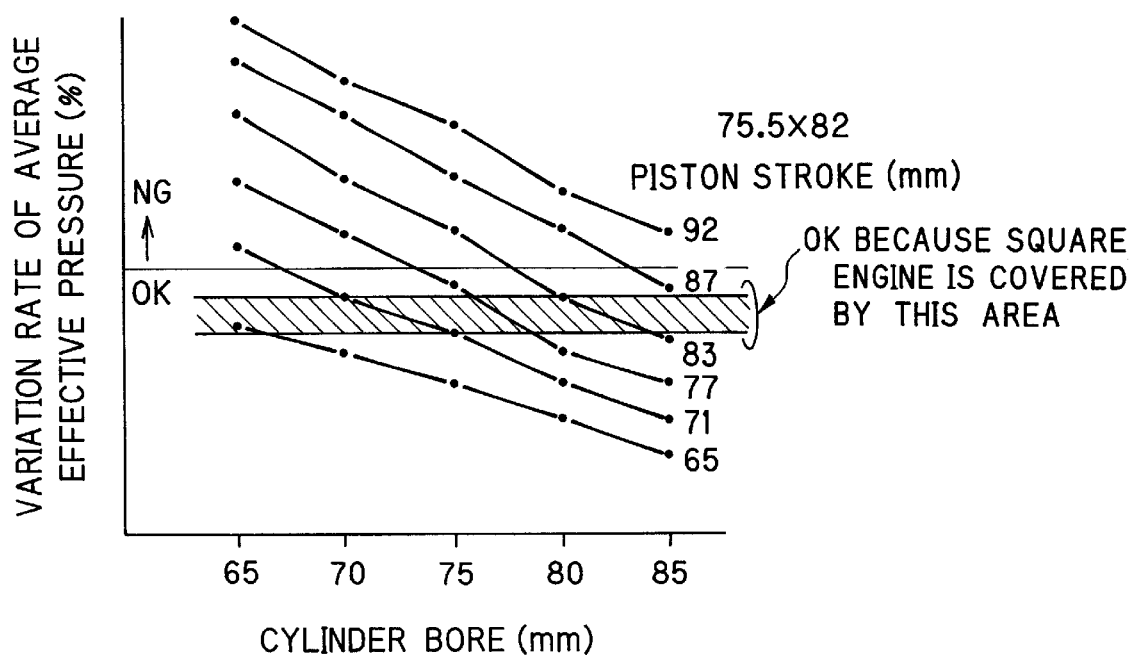
FIG. 7 is a graph illustrating a relationship between a cylinder bore, a piston stroke, and combustion stability.
Figure 8:
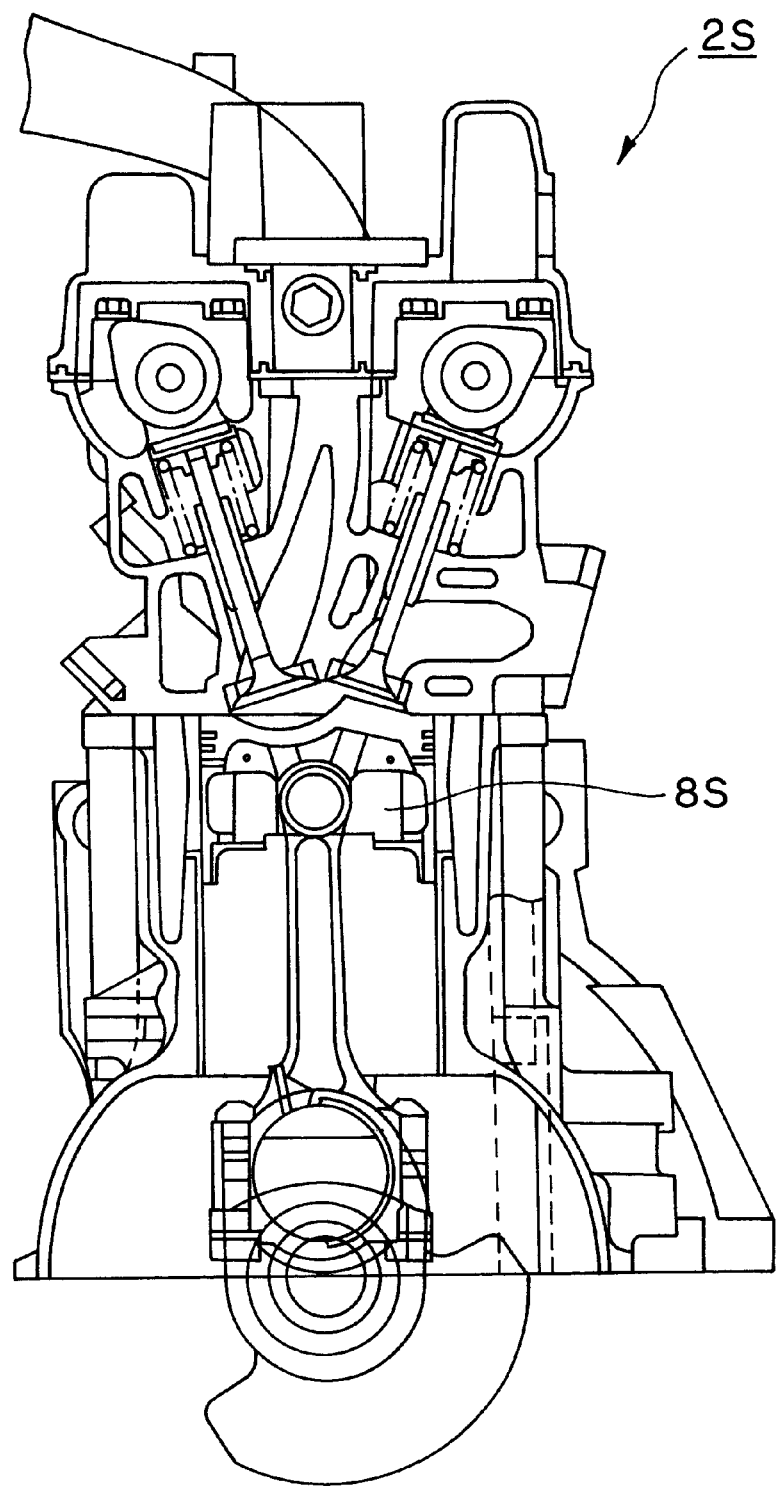
FIG. 8 is a cross-sectional view, illustrating a valve portion of a cylinder direct injection engine of a short stroke type.
Figure 9:
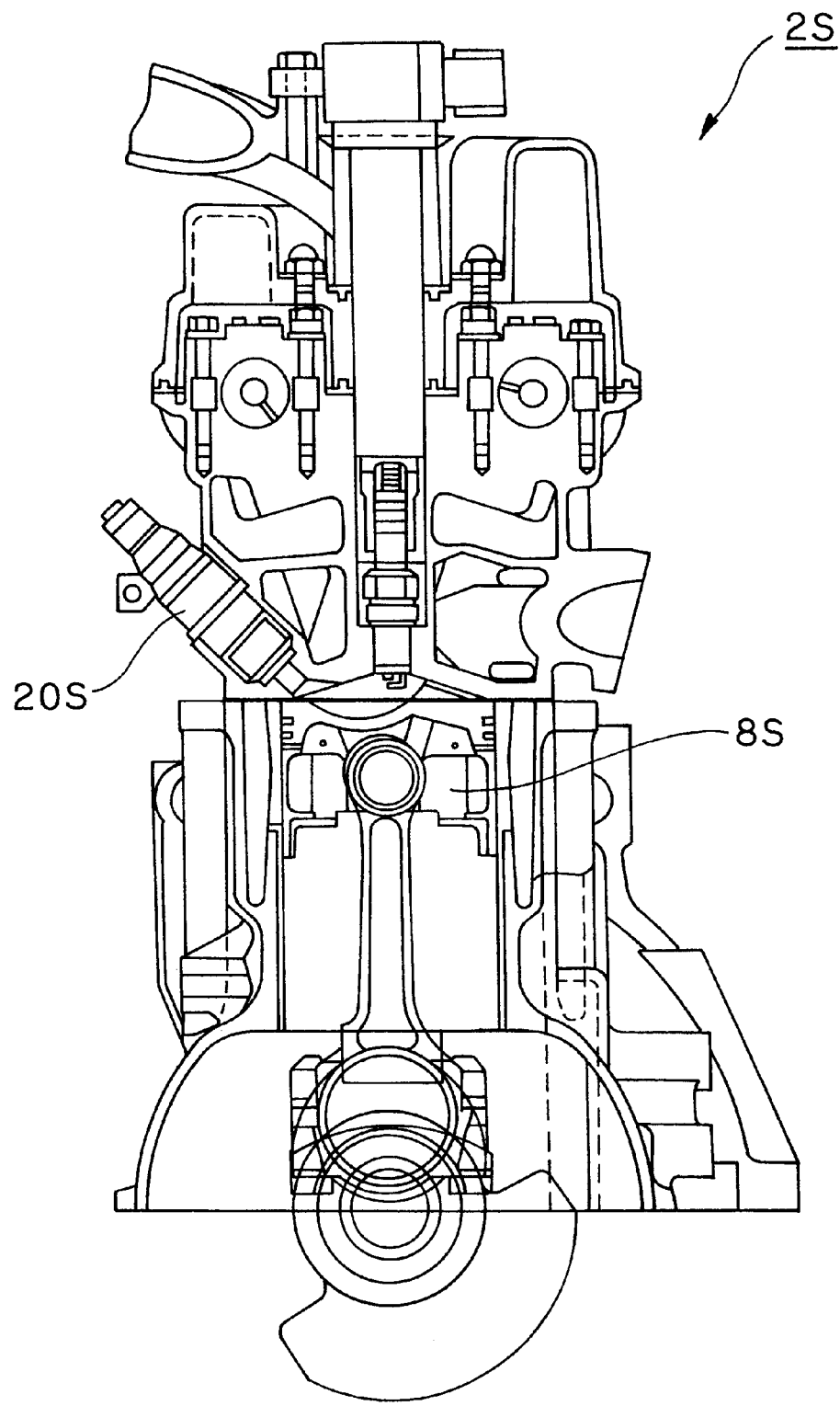
FIG. 9 is a cross-sectional view, illustrating a spark plug portion of the FIG. 8 engine.

Just for reference, a spray angle of the injector 20 within the range of 10° to 80° provides experimental results showing a relationship among the cylinder bore, the piston stroke, and combustion stability, as illustrated in FIG. 7. As a consequence, an ideal stratified mixture and thus stable combustion are achievable when the following relationships between the cylinder bore and the piston stroke are established:

(1) For an 85 mm or smaller cylinder bore, the piston stroke is at most 87 mm;

(2) For an 80 mm or smaller cylinder bore, the piston stroke is at most 83 mm;

(3) For a 75 mm or smaller cylinder bore, the piston stroke is equal to or less than 77 mm;

(4) For a 70 mm or smaller cylinder bore, the piston stroke is equal to or less than 71 mm; and (5) For a 65 mm or smaller cylinder bore, the piston stroke is at most 65 mm.

Moreover, in view of the above-mentioned experimental results, a short stroke type of an engine 2S as illustrated in FIGS. 8–12 is available as well. The engine 2S is of a non-square type in which the piston stroke is made smaller in size than the cylinder bore.

In order to achieve improved performance, the short stroke type engine 2S is constructed to provide a 60 mm piston stroke when the cylinder bore is 68 mm.

Next, the operation of the above embodiment will be described.

Figure 4:
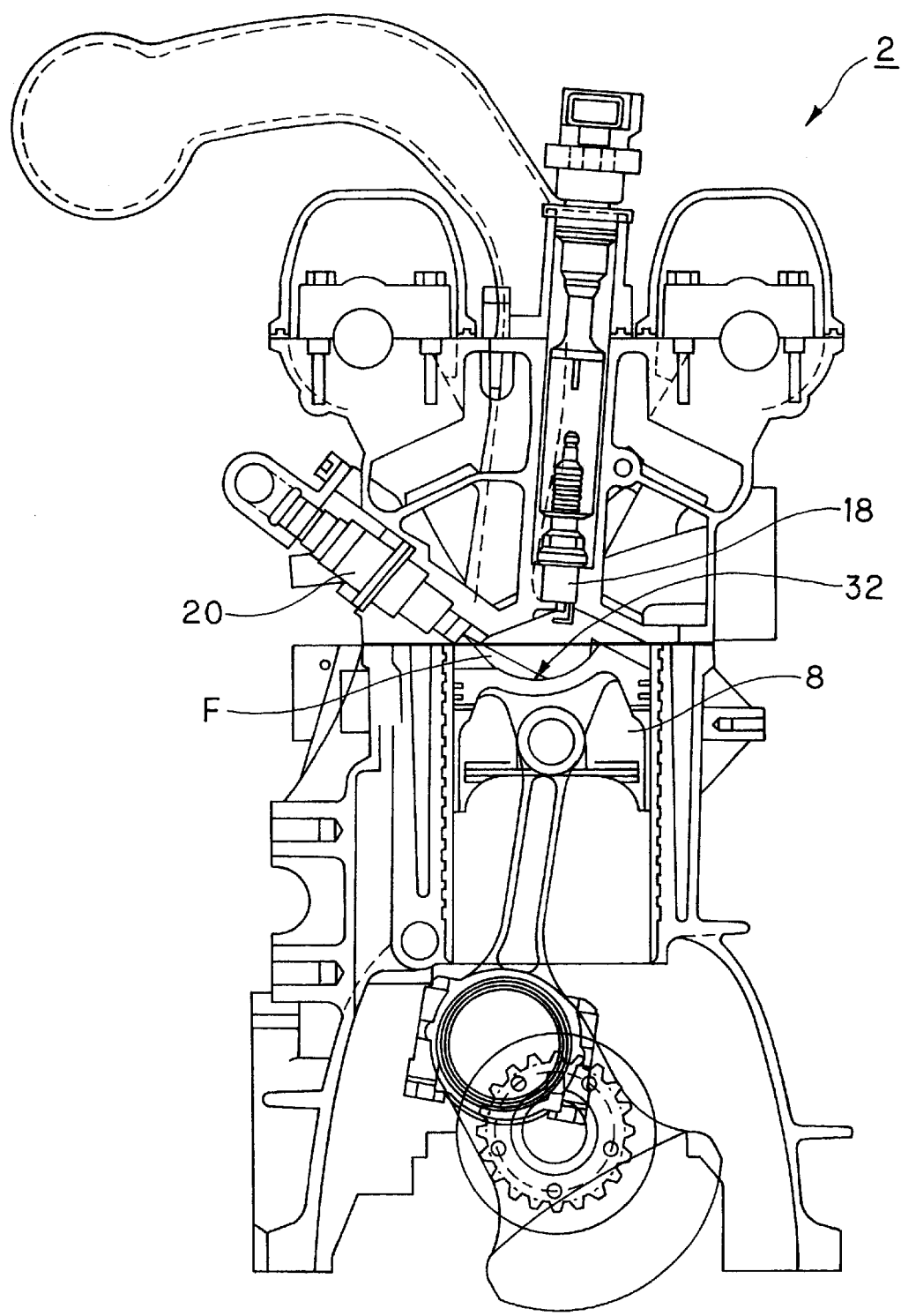
FIG. 4 is a cross-sectional view, showing the spark plug portion of the engine of the square type in a 30° crank angle (CA) BTDC state.
Figure 5:
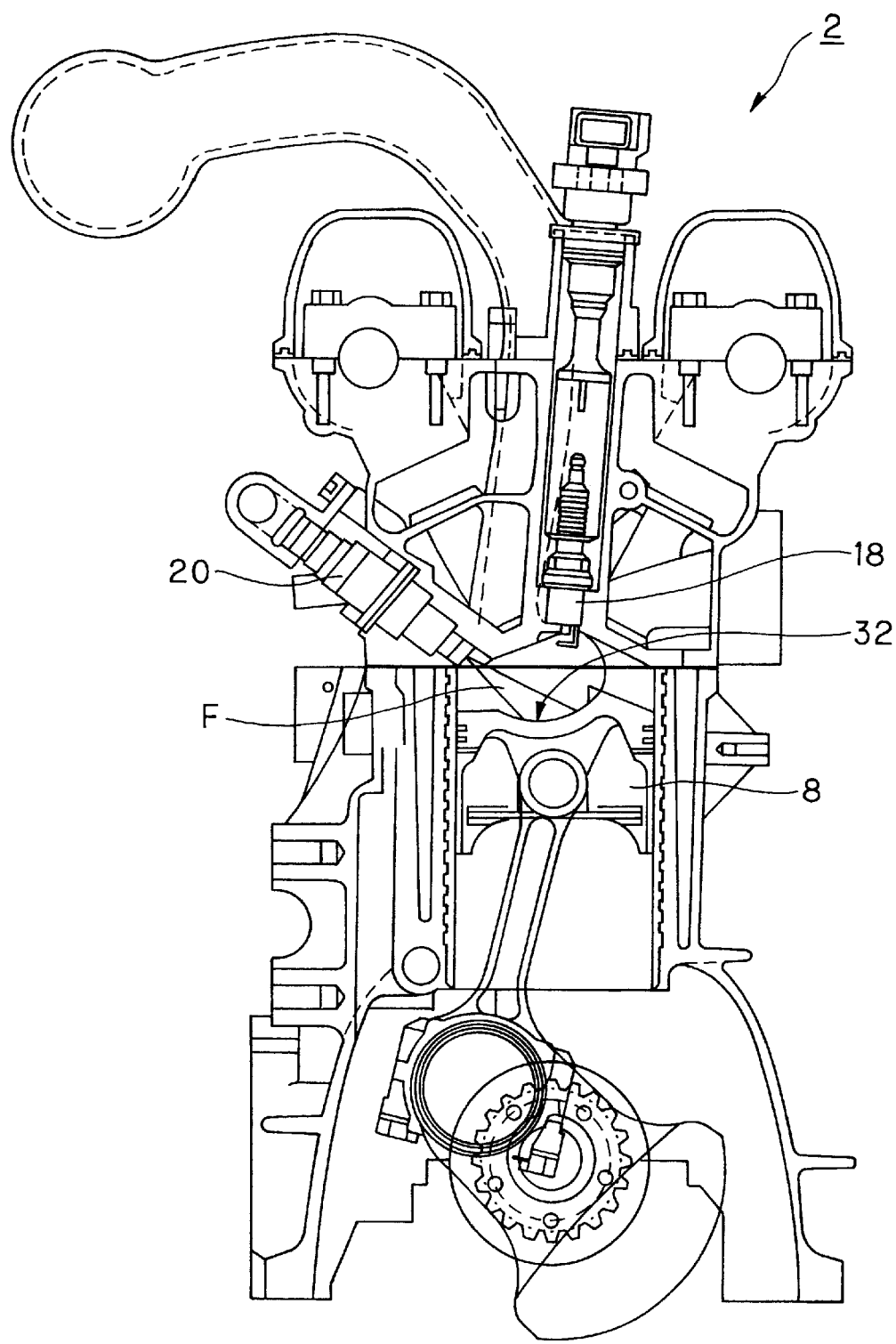
FIG. 5 is a cross-sectional view, showing the spark plug portion of the engine of the square type in a 45° crank angle (CA) BTDC state.
Figure 6:
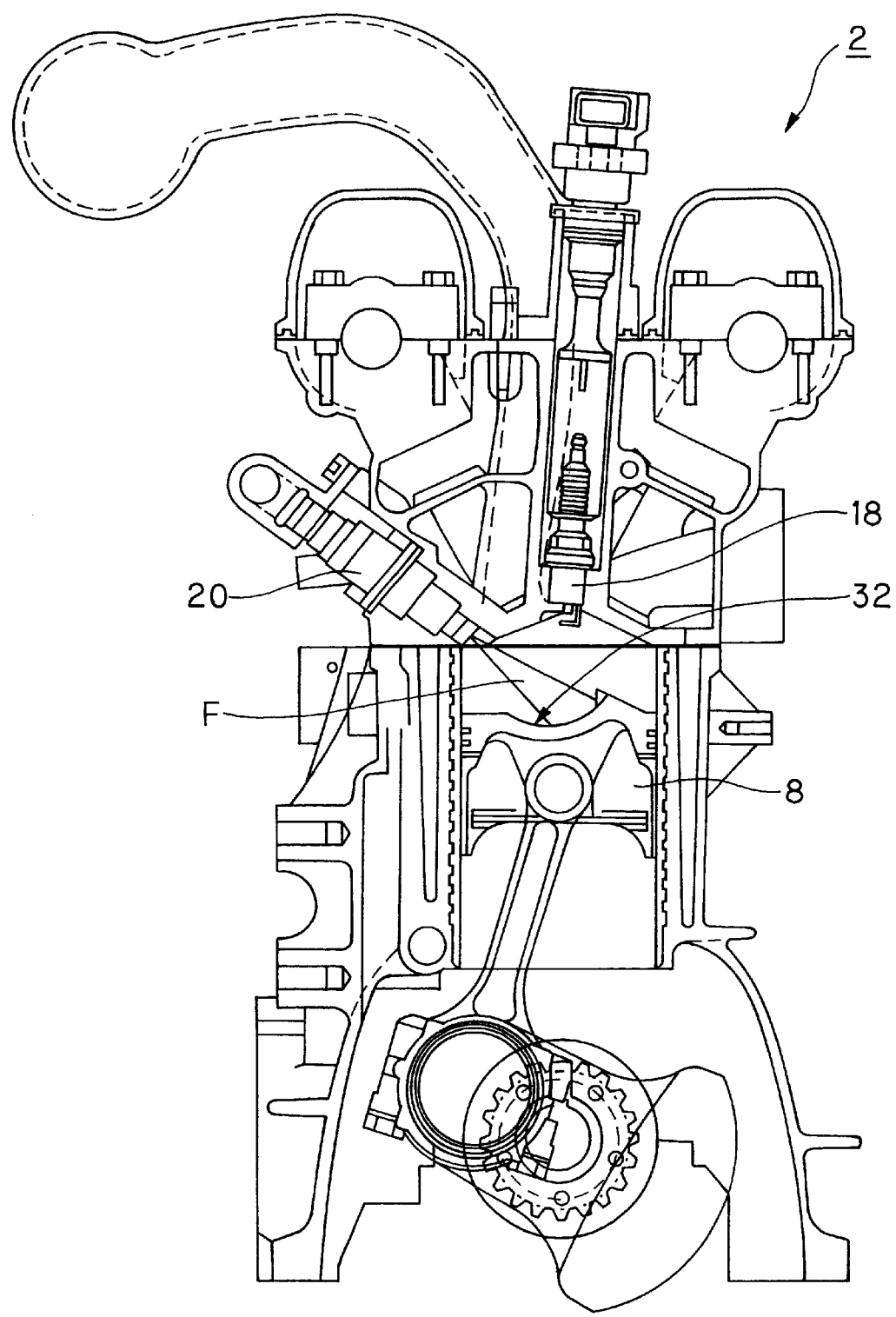
FIG. 6 is a cross-sectional view, illustrating the spark plug portion of the engine of the square type in a 60° crank angle (CA) BTDC state.

In a square type engine 2 having a 75 mm cylinder bore and a 75 mm piston stroke, the piston 8 is positioned at top dead center, as illustrated in FIG. 2, and is then moved into a 30° crank angle (CA) BTDC state as shown in FIG. 4. The piston 8 is further brought into a 45° crank angle (CA) BTDC state as shown in FIG. 5, followed by a 60° crank angle (CA) BTDC state as illustrated in FIG. 6.

Then, the injector 20 discharges fuel into the concave area 32 of the piston 8 during a compression stroke.

At this time, atomized fuel "F" issuing from the injector 20 is trapped at the concave area 32. The trapped fuel "F" is then collected near the spark plug 18 while at the same time the piston 8 is raised. As a result, such collected fuel "F" produces a stratified or layered fuel mixture in cooperation with a lean mixture that surrounds the stratified mixture.

Figure 10:
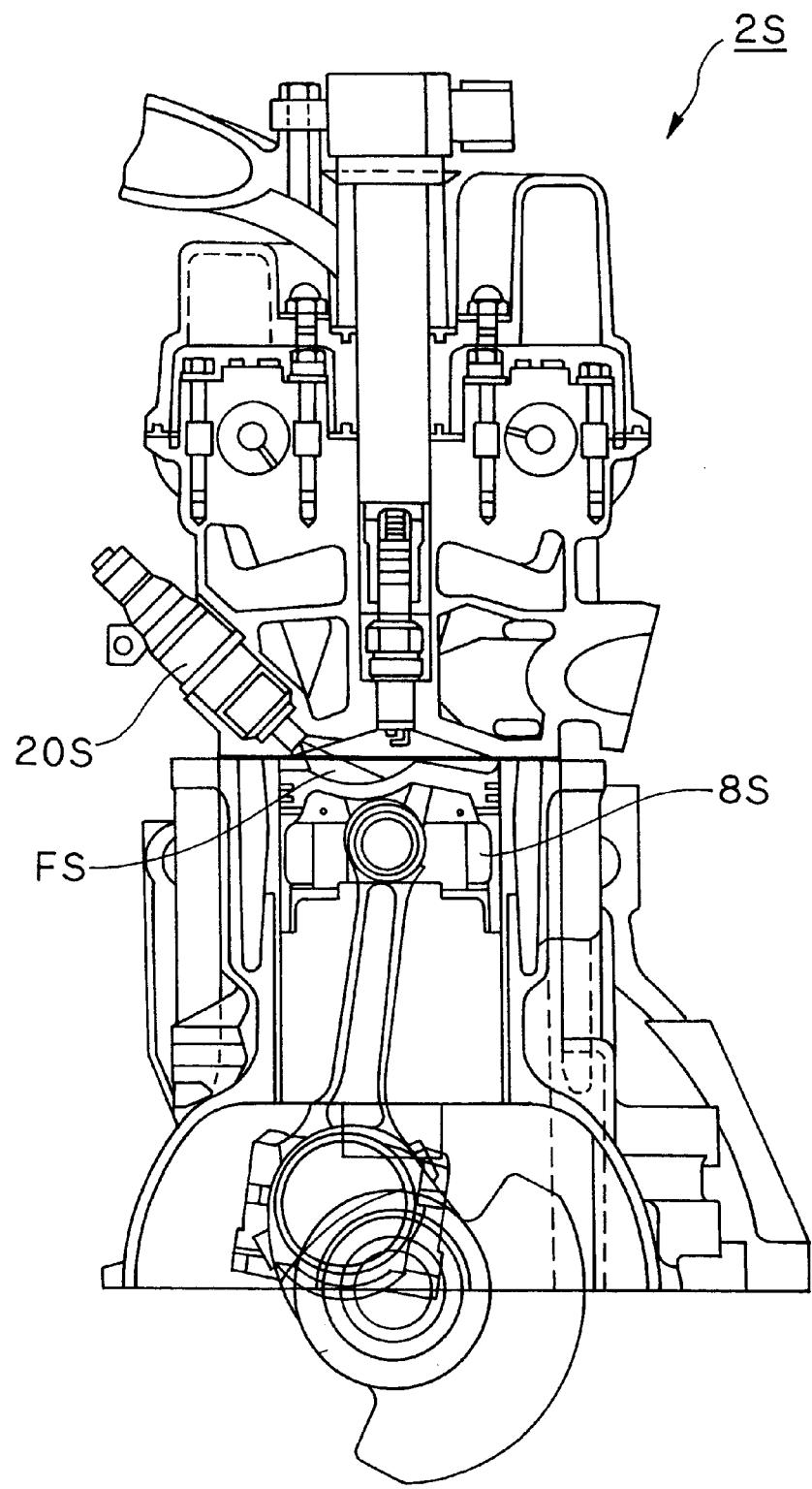
FIG. 10 is a cross-sectional view, showing the spark plug portion of the engine of the short stroke type in a 30° crank angle (CA) BTDC state.
Figure 11:
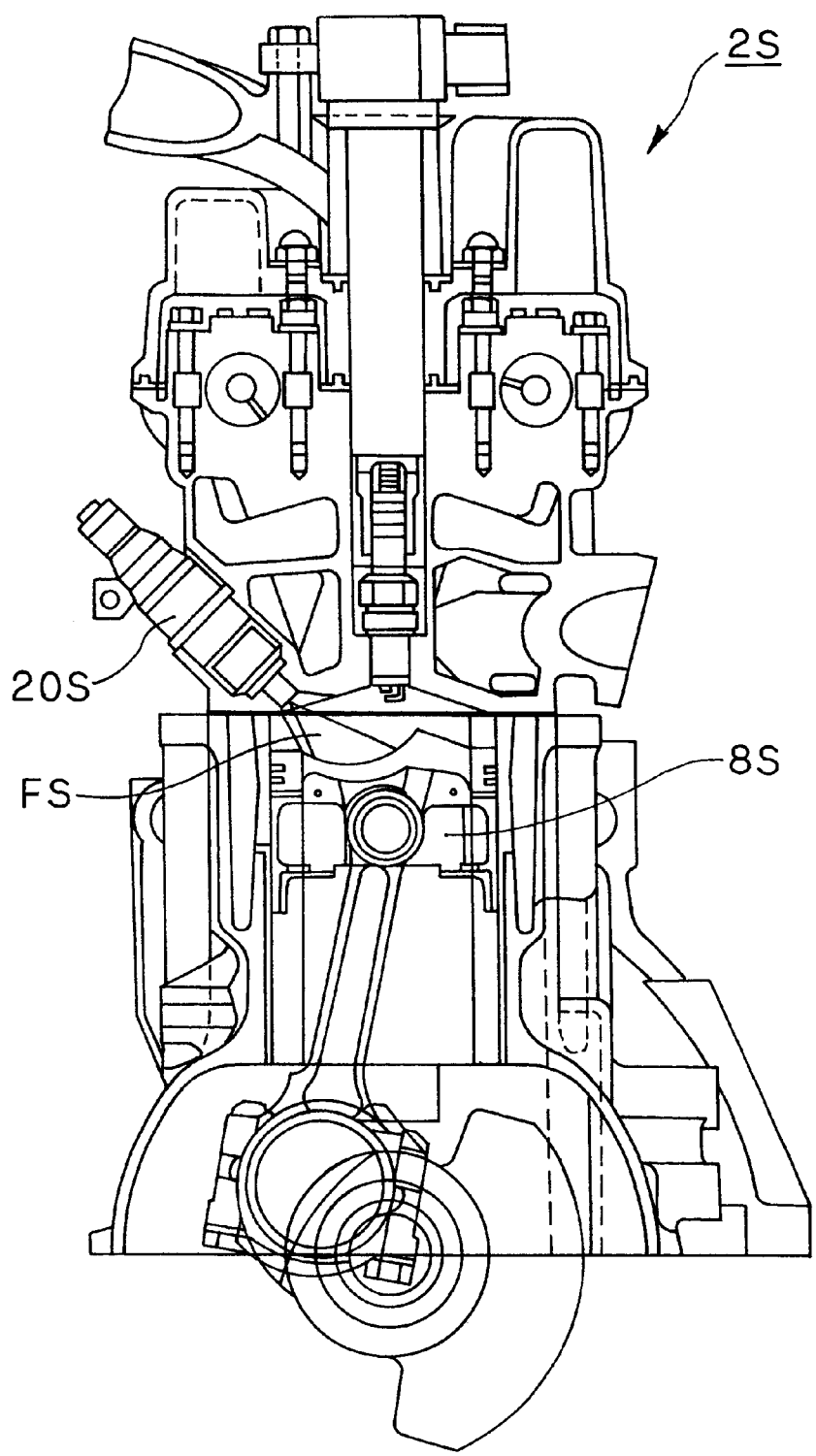
FIG. 11 is a cross-sectional view, showing the spark plug portion of the engine of the short stroke type in a 45° crank angle (CA) BTDC state.
Figure 12:
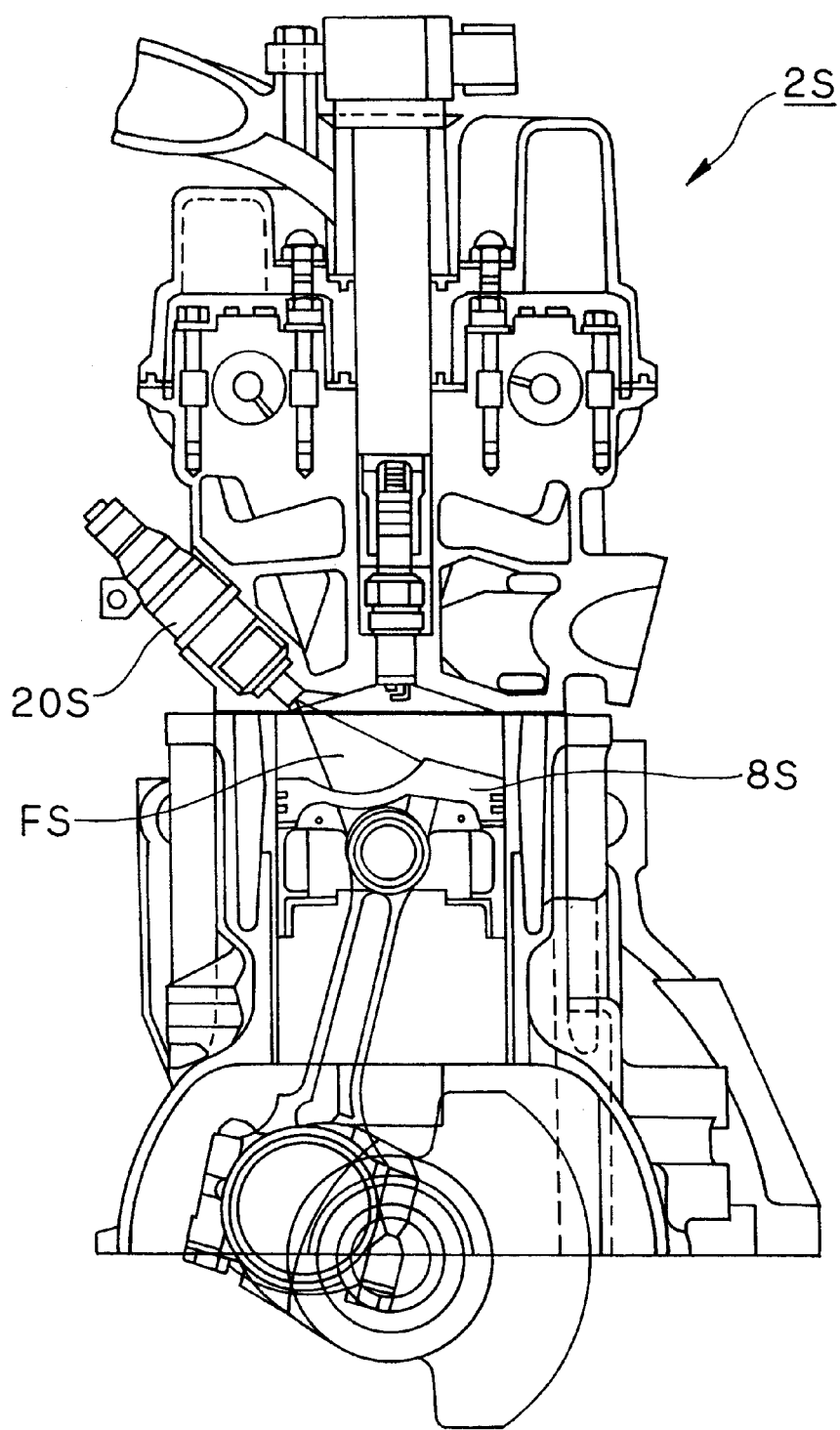
FIG. 12 is a cross-sectional view, illustrating the spark plug portion of the engine of the short stroke type in a 60° crank angle (CA) BTDC state.

As illustrated in FIGS. 8–12, a short stroke type engine 2S provides a reduced amount of displacement of a piston 8S with respect to a crank rotational angle, and further a small deviation in phase exists between the piston 8S and atomized fuel "FS" from an injector 20S. As a result, the short stroke type engine 2S provides an ideal stratified mixture within the range of a 30° crank angle (CA) BTDC state as shown in FIG. 10 to a 60° crank angle (CA) BTDC state as illustrated in FIG. 12 through a 45° crank angle (CA) BTDC state as illustrated in FIG. 11.

In conclusion, in the engine 2, a difference in size between the piston stroke and the cylinder bore diameter ranges from 0% to 4%, and the piston stroke is greater than the cylinder bore when the difference is unequal to 0%. More specifically, the engine 2 is structured to cover a range from the aforesaid square type to another in which the piston stroke is made greater in size than the cylinder bore by an amount of at most 4%. Thus, the engine 2 may be, e.g., of a square type having a 75 mm cylinder bore and a 75 mm piston stroke. Such a construction provides a reduced amount of displacement of the piston 8 with respect to the crank rotational angle, and thus an ideal stratified fuel mixture is achieved during compression stroke. As a result, fuel can be combusted in a stable manner.

In addition, such stable combustion can bring a variety of effects such as an improvement in fuel efficiency and respective reductions in torque variations, vibration, discharge volumes of THC (torque hydrocarbon) and CO, smoldering around the injector 20 and the spark plug 18, soot generation, and contamination of engine oil.

Further, the short stroke type engine 2S provides a reduced amount of displacement of the piston 8S with respect to the crank rotational angle, and then a reduced deviation in phase between atomized fuel "FS" and the piston 8S. As a result, in the engine 2S it is possible to obtain an ideal stratified mixture within the range of the 30° crank angle (CA) BTDC state as shown in FIG. 10 to the 60° crank angle (CA) BTDC state as illustrated in FIG. 12 through the 45° crank angle (CA) BTDC state as illustrated in FIG. 11. This is advantageous in view of practical use. Moreover, the engine 2S provides an increased extent of tolerance of injection timing for stratification of the fuel.

FIGS. 13–22 illustrate a second embodiment. The same reference characters are hereinafter utilized for features identical in function to those described in the first embodiment.

The second embodiment is characterized in that a cylinder direct injection engine 2 has a piston stroke of about 50 mm to about 80 mm, a cylinder bore 4B with a diameter of about 50 mm to about 92 mm, and a ratio between the piston stroke and the cylinder bore diameter of about 0.8 to about 1.4.

More specifically, the engine 2 is constructed to have a piston stroke of a piston 8 set to be within the range of 50 mm to 80 mm, and a cylinder bore diameter of a cylinder block 4 to be set within the range of 50 mm to 92 mm. Further, a stroke-bore ratio is set to lie within the range of 0.8 to 1.4. These settings avoid an excessively extended length of the piston stroke.

With further reference to the above numeral ranges, combustion is viewed as stable when a variation rate of average effective pressure is equal to or less than 5%.

Figures 16, 17:
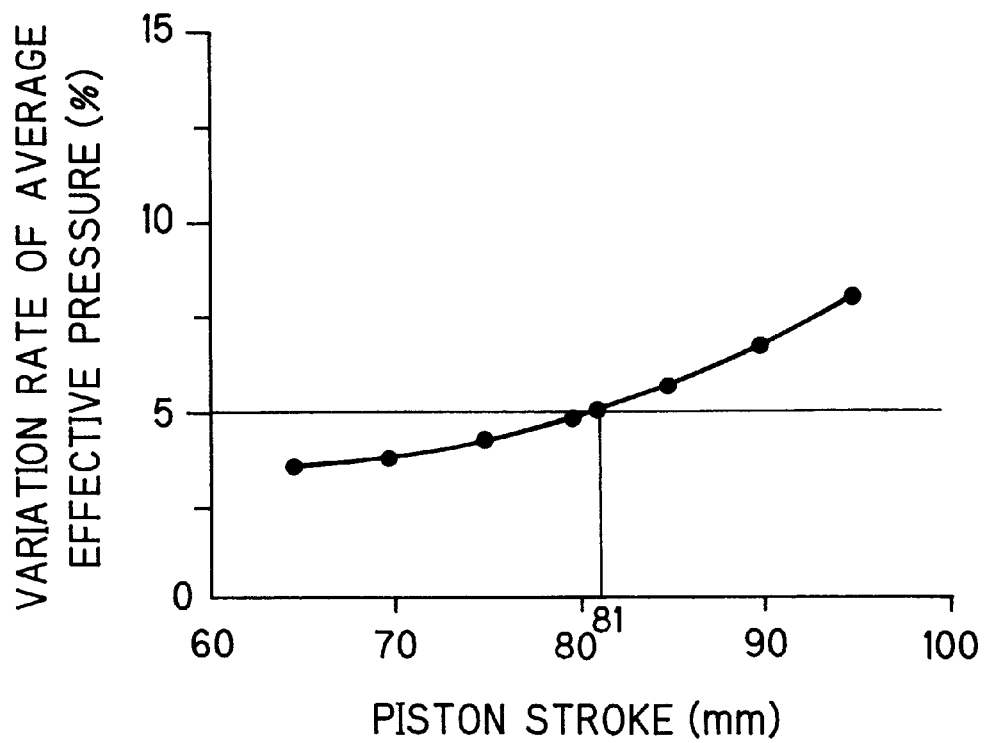
FIG. 16 is a graph illustrating a relationship between a piston stroke and a variation rate of average effective pressure.
FIG. 17 is an illustration showing a relationship between a cylinder bore and scuffing.

As shown in FIG. 16, when the piston stroke is at most 81 mm, then the variation rate can be equal to or less than 5%. Thus, an upper limit of the piston stroke must be set to be 80 mm.

FIG. 17 illustrates a relationship between the cylinder bore and scuffing. As is evident from experimental results in FIG. 17, the scuffing occurs with a 45 mm or less cylinder bore diameter, while no scuffing occurs with a 50 mm or greater cylinder bore diameter. Consequently, a lower limit of the cylinder bore diameter must be set to be 50 mm.

Figure 13:
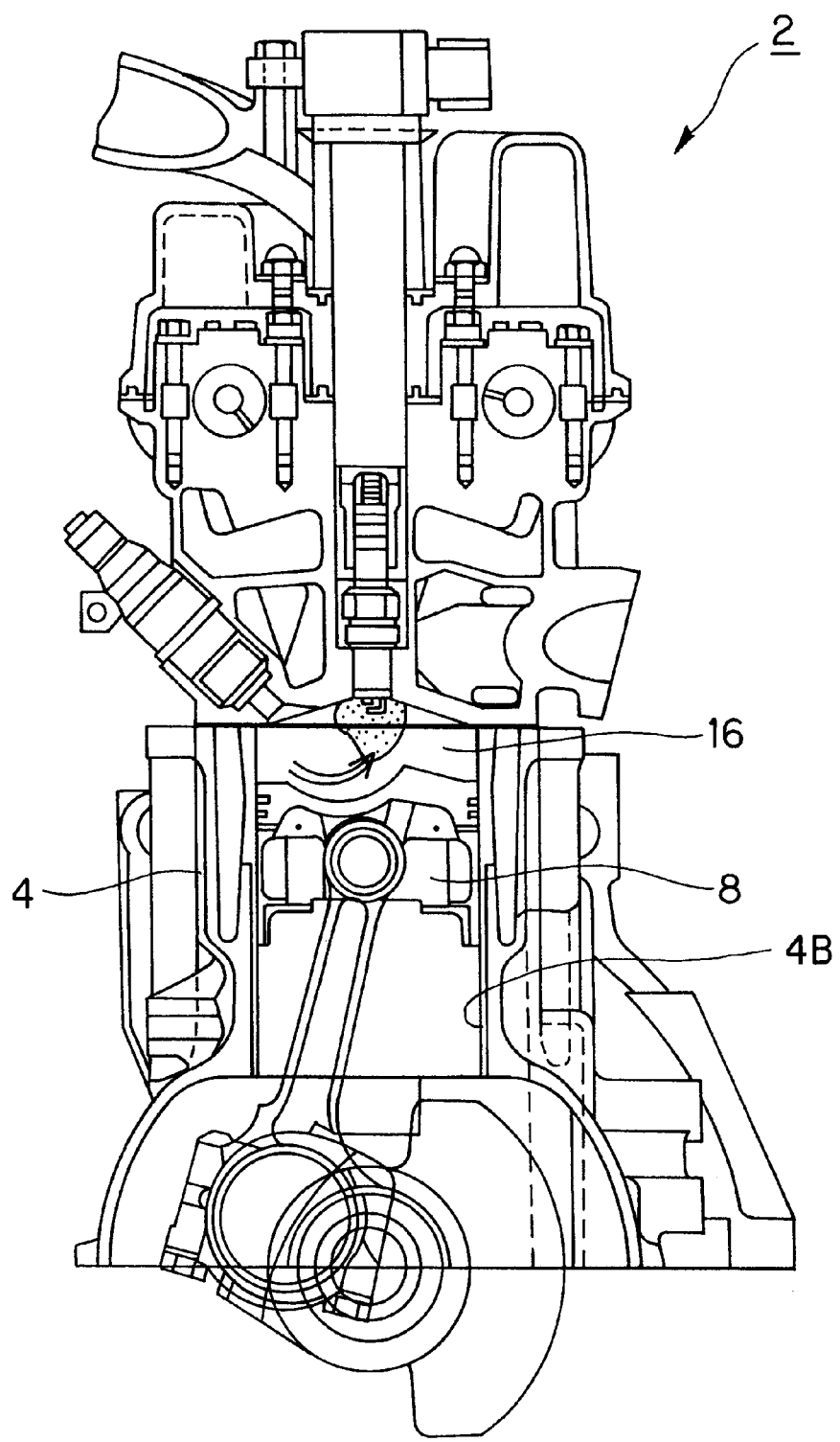
FIG. 13 is a cross-sectional view, illustrating a spark plug portion of a cylinder direct injection engine according to a second embodiment, in which a tumble or swirl stream is illustrated.
Figure 18:
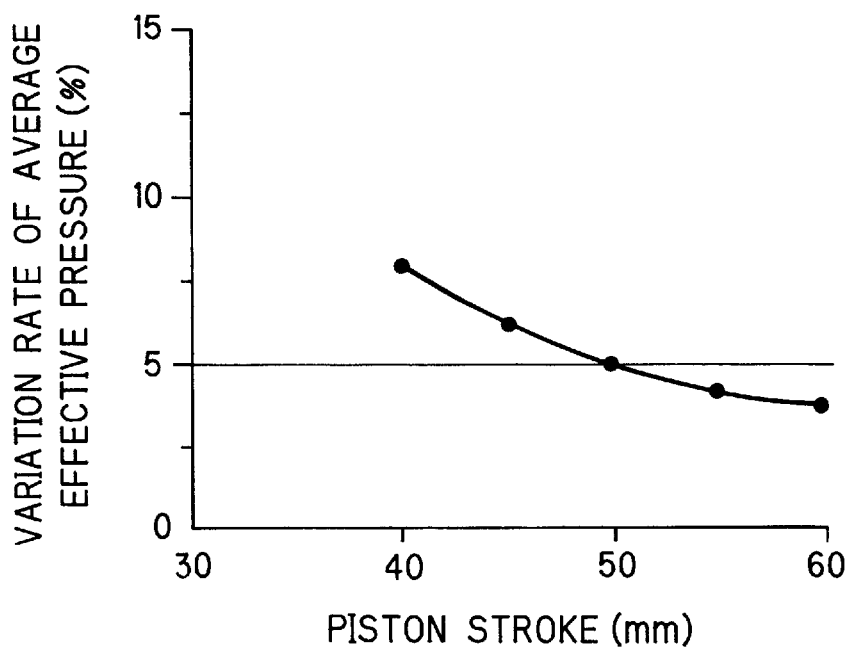
FIG. 18 is a graph showing a relationship between the piston stroke and the variation rate of average effective pressure.

As illustrated in FIG. 13, a tumble stream (or "swirl stream") developed in the combustion chamber 16 is produced by means of a 50 mm or greater piston stroke to a sufficient level that conveys fuel. As a result, a satisfactorily stratified mixture is achievable. As shown in FIG. 18, when the piston stroke is at least 50 mm, then the variation rate of average effective pressure can be equal to or less than 5%. Accordingly, a lower limit of the piston stroke must be set to be 50 mm.

Figure 14:
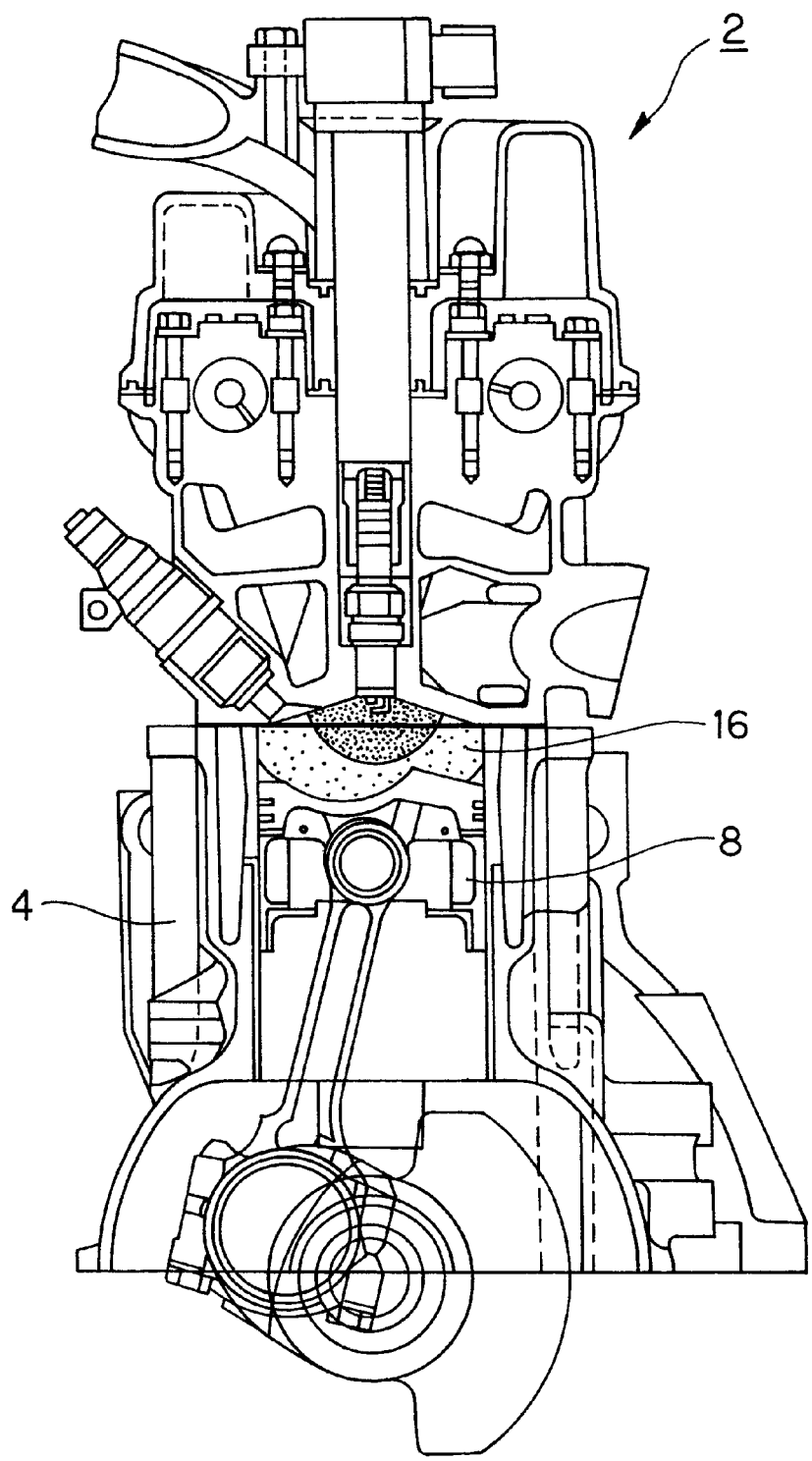
FIG. 14 is a cross-sectional view, showing the spark plug portion of the engine in which a stratified mixture is illustrated.
Figure 19:
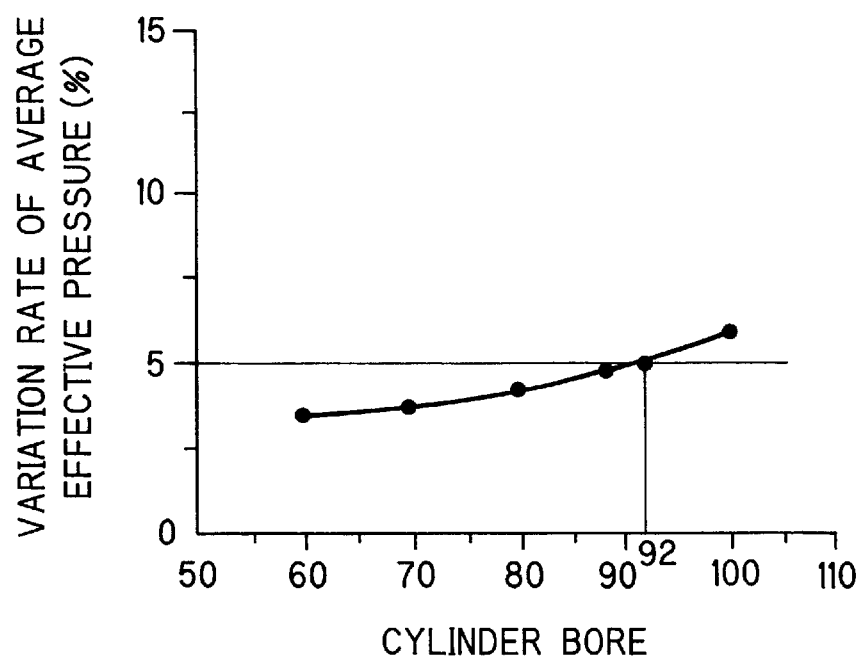
FIG. 19 is a graph showing a relationship between the cylinder bore and the variation rate of average effective pressure.

Further, as illustrated in FIG. 19, when the cylinder bore is at most 92 mm, then the variation rate of average effective pressure can be equal to or less than 5%. As a result, a lean mixture is properly distributed in the combustion chamber 16 as shown in FIG. 14. Accordingly, an upper limit of the cylinder bore diameter must be set to be 92 mm.

Figure 15:
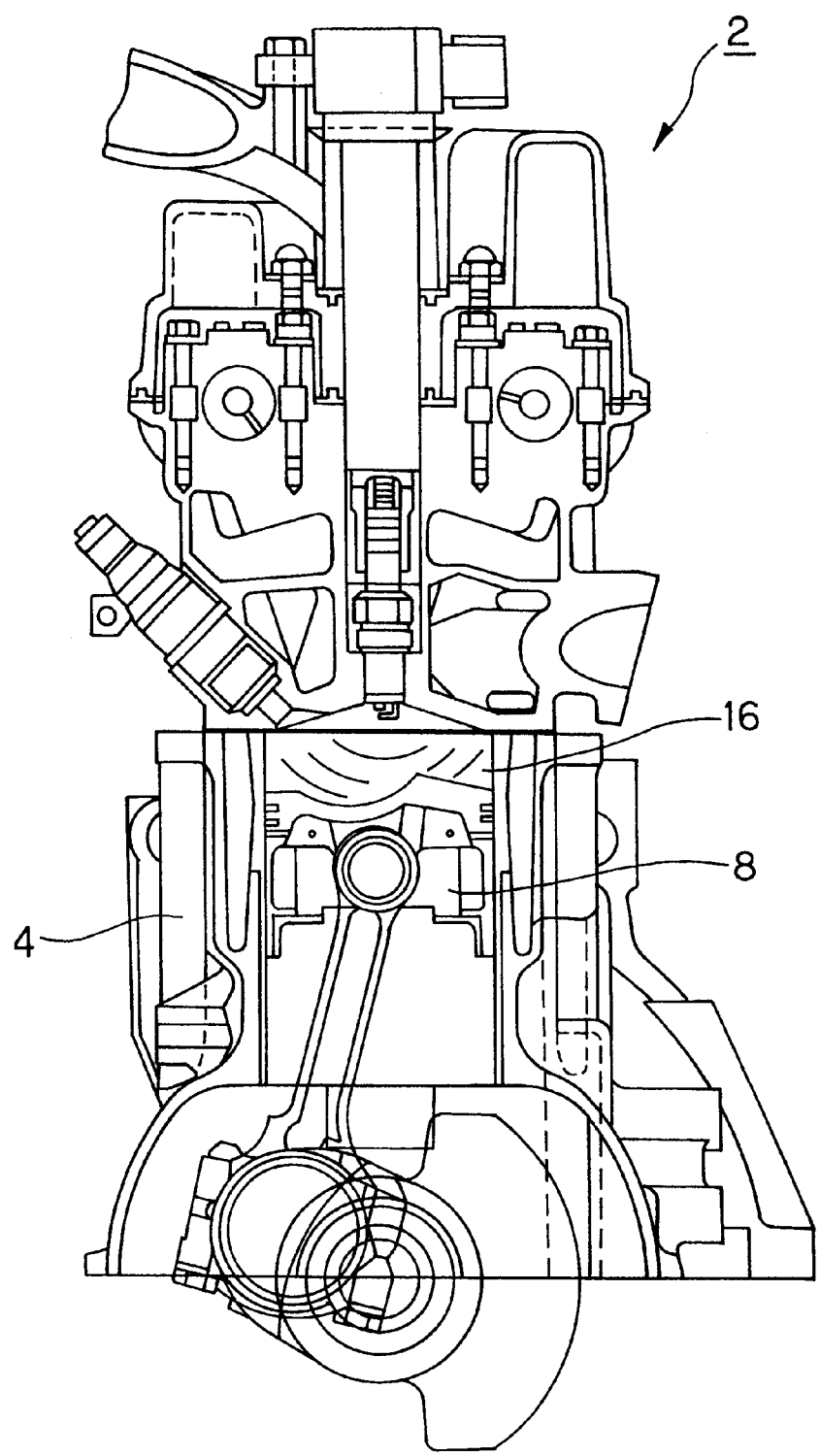
FIG. 15 is a cross-sectional view, showing the spark plug portion of the engine in which flame propagation is illustrated.
Figure 20:
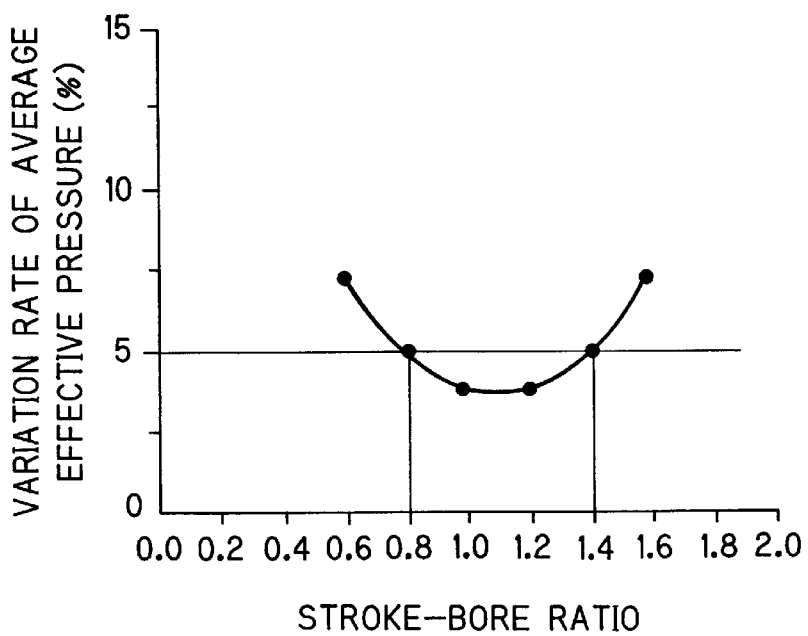
FIG. 20 is a graph showing a relationship between a stroke-bore ratio and the variation rate of average effective pressure.

Moreover, as illustrated in FIG. 20, when the stroke-bore ratio lies in the range of 0.8 to 1.4, then the variation rate of average effective pressure can be equal to or smaller than 5%. As a result, as illustrated in FIG. 15, flame is propagated in a substantially uniform manner in the combustion chamber 16, with consequential stable combustion. Thus, the stroke-bore ratio must be set to be within the range of 0.8 to 1.4.

Figure 21:
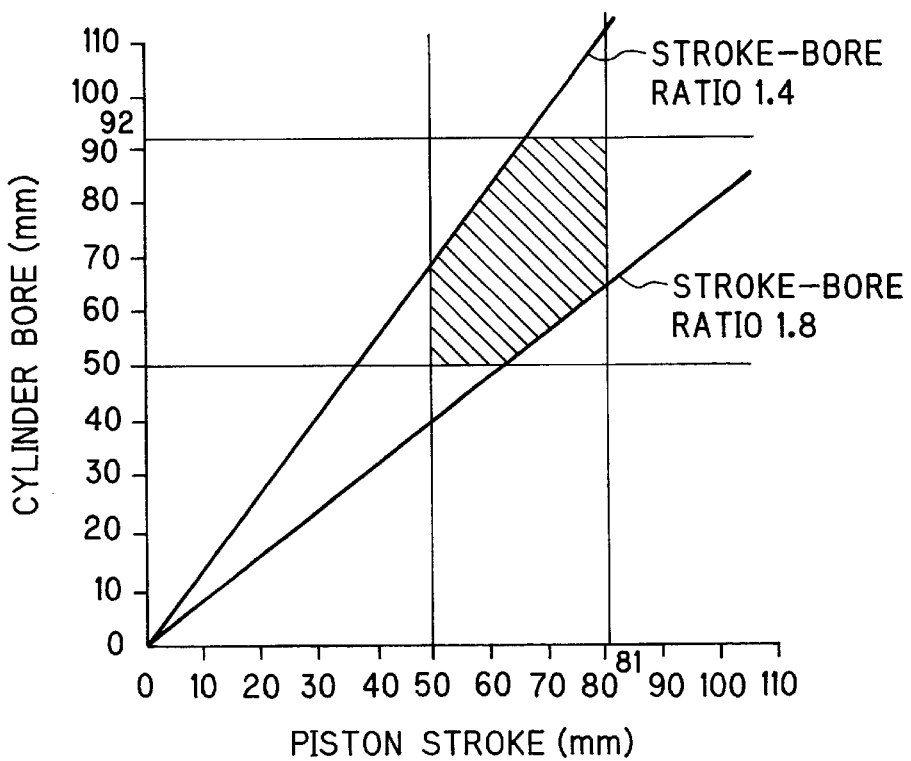
FIG. 21 is a graph illustrating a relationship between the piston stroke and the cylinder bore.

FIG. 21 illustrates a shaded or slanted area defined by the above-described numeral settings, in which stable combustion is provided without scuffing.

Figure 22:
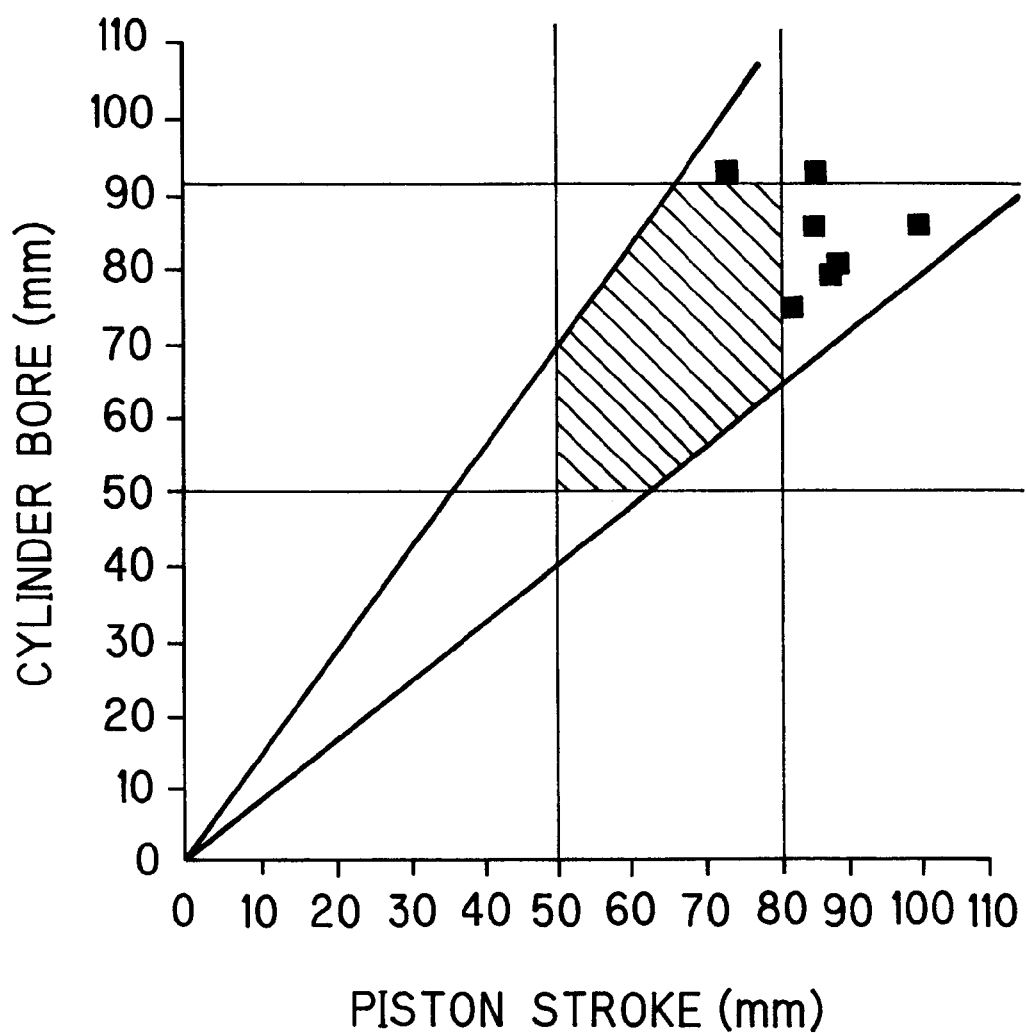
FIG. 22 is a graph illustrating a relationship between the piston stroke and the cylinder bore in existing engines.

Just for reference, referring to FIG. 22, black rectangular mark portions are shown denoting existing engines. As seen from FIG. 22, these engines having a small discharge volume do not fall within the shaded or slanted area.

In conclusion, the piston stroke is set to range from 50 to 80 mm; the cylinder bore diameter is set to be within the range between 50 to 92 mm; and, the stroke-bore ratio is set to fall within the range of 0.8 to 1.4. Then, the engine 2 thus constructed is possible to prevent scuffing, and thus stabilizes combustion.

When the piston stroke is set to be at most 80 mm, then the variation rate of average effective pressure is equal to or less than 5%. As a result, a satisfactorily stratified fuel mixture is achievable. In addition, when piston stroke is set to be at least 50 mm, then the variation rate can be equal to or less than 5%. At the same time, the tumble stream can be produced to a sufficient level that delivers fuel. As a result, a satisfactorily stratified mixture can be realized, and thus combustion can be stabilized.

When the cylinder bore diameter is set to be at least 50 mm, then it is possible to reliably prevent scuffing, which otherwise would occur as a result of fuel adhering to a cylinder wall surface. In addition, when the cylinder bore diameter is set to be at most 92 mm, then the variation rate of average effective pressure can be equal to or less than 5%. As a result, a lean mixture in the combustion chamber 16 can properly be distributed therein, and thus stable combustion is provided.

Moreover, when the stroke-bore ratio is set to lie within the range of 0.8 to 1.4, then the aforesaid variation rate can be equal to or smaller than 5%. Further, flame can be propagated in a substantially uniform manner in the combustion chamber 16, which results in stable combustion.

Figure 23:
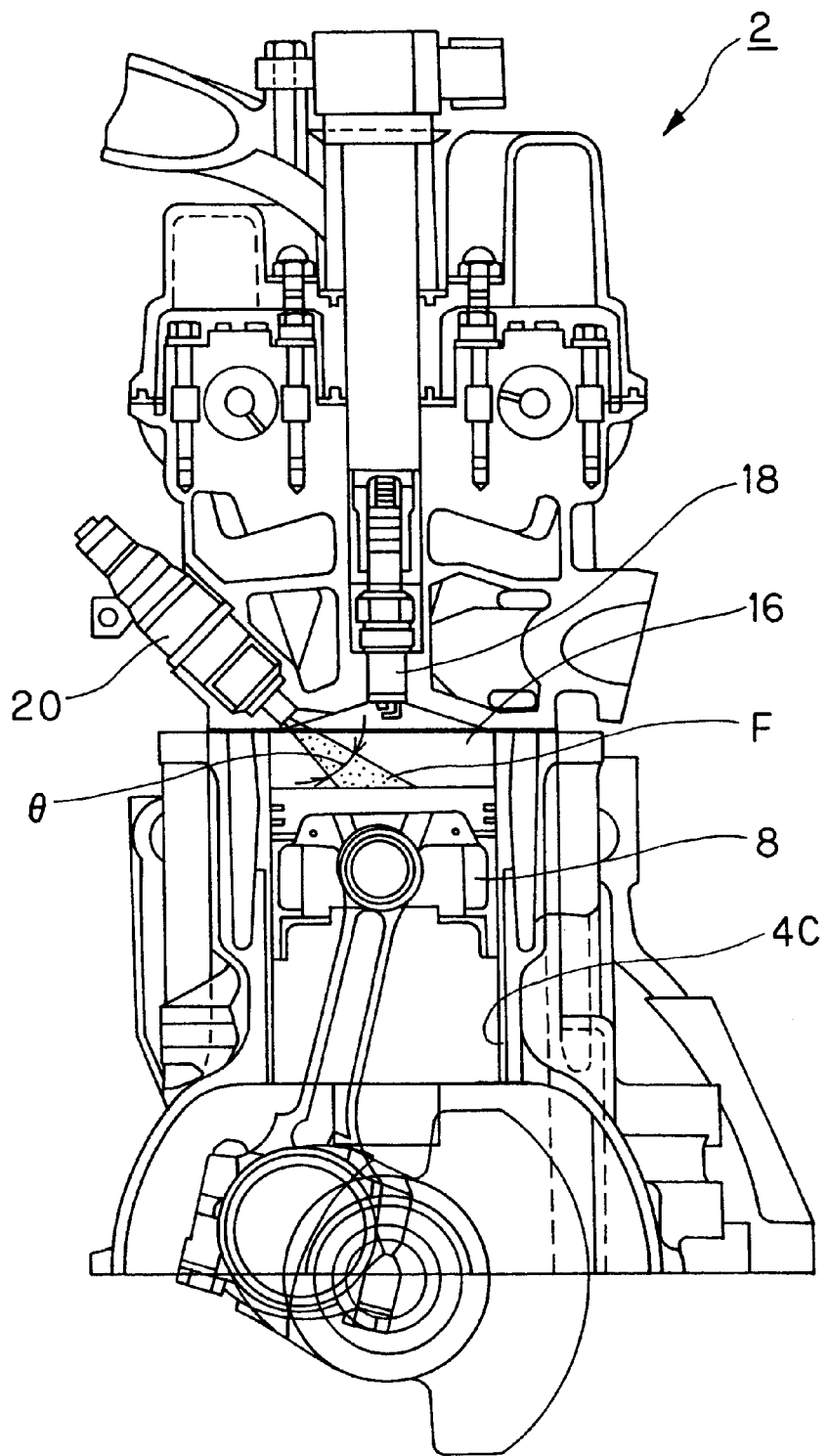
FIG. 23 is a cross-sectional view illustrating a spark plug portion of a cylinder direct injection engine having a 30° cone angle, a 70 mm cylinder bore, and a 45° injector installation angle.
Figure 24A:
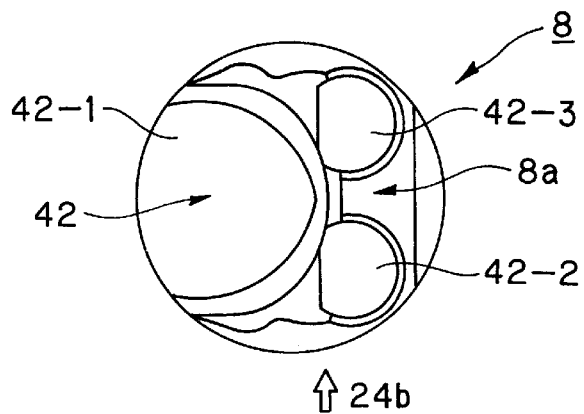
FIG. 24(*a*) is a plan view, showing a piston.
Figure 24B:
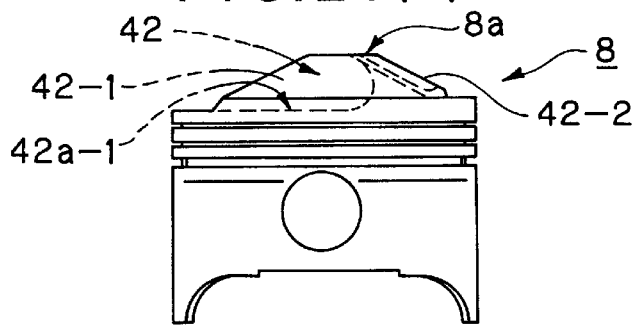
Figure 25:
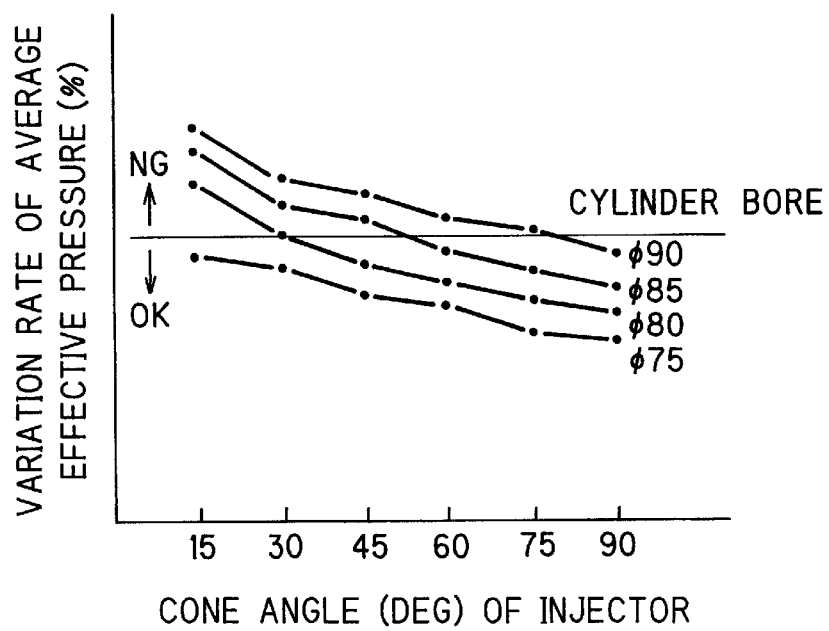
FIG. 25 is a graph illustrating a relationship between a cone angle, a cylinder bore, and combustion stability.
Figure 26:
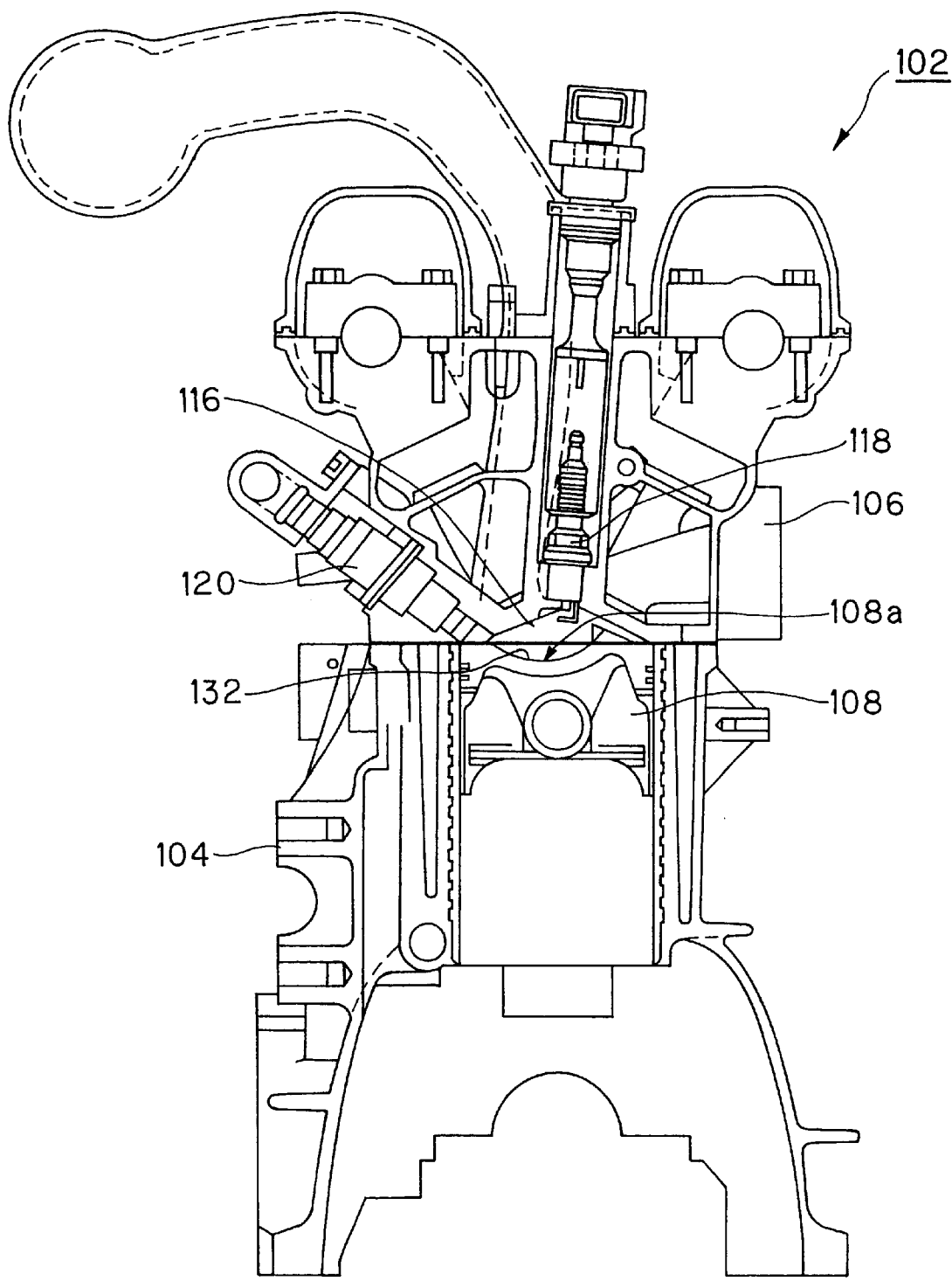
FIG. 26 is a cross-sectional view, illustrating a spark plug portion of a cylinder direct injection engine having a 75 mm cylinder bore and a 90 mm piston stroke.
Figure 27:
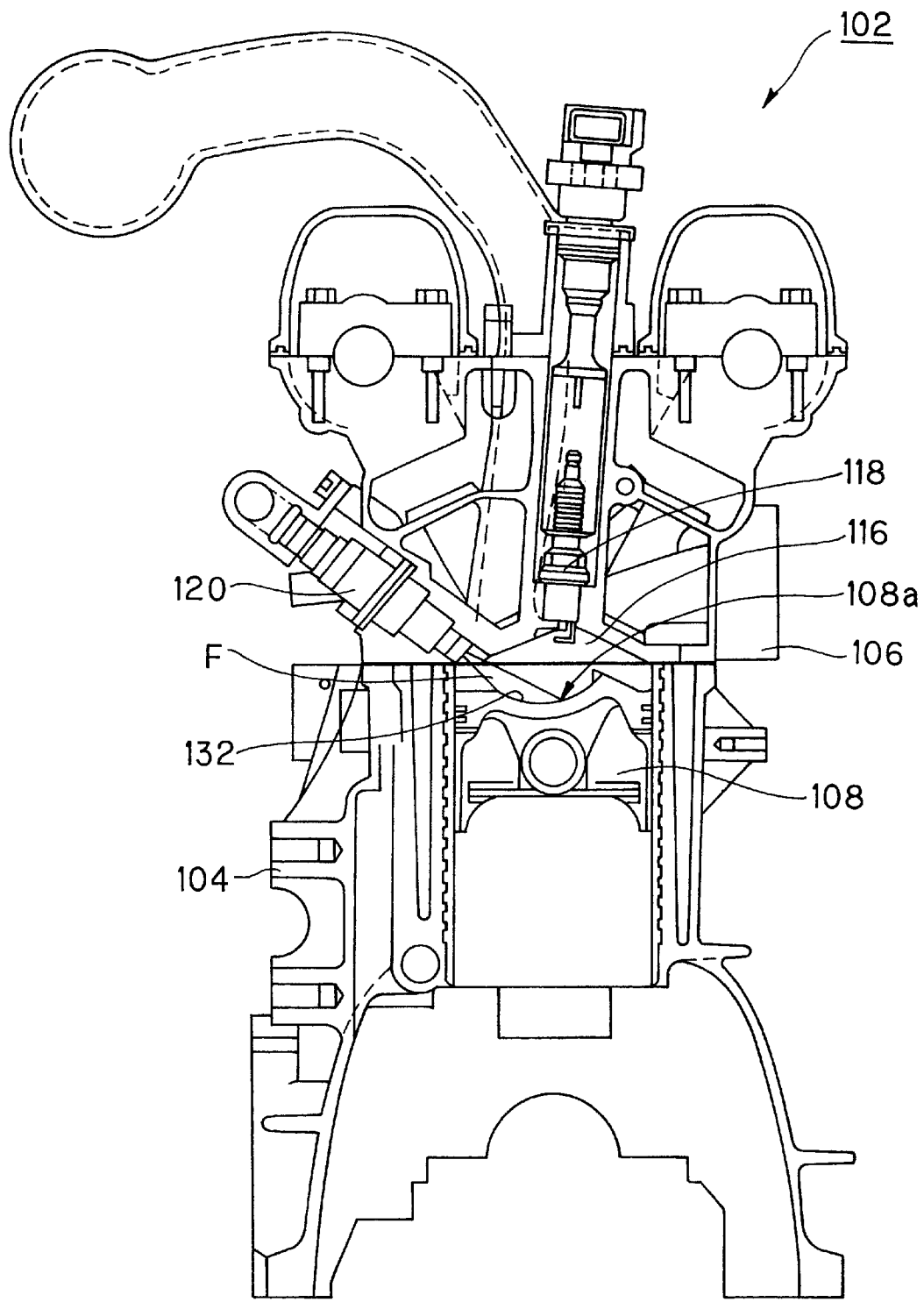
FIG. 27 is a cross-sectional view, showing the spark plug portion of the engine in a 30° crank angle (CA) BTDC state according to a first known construction.
Figure 28:
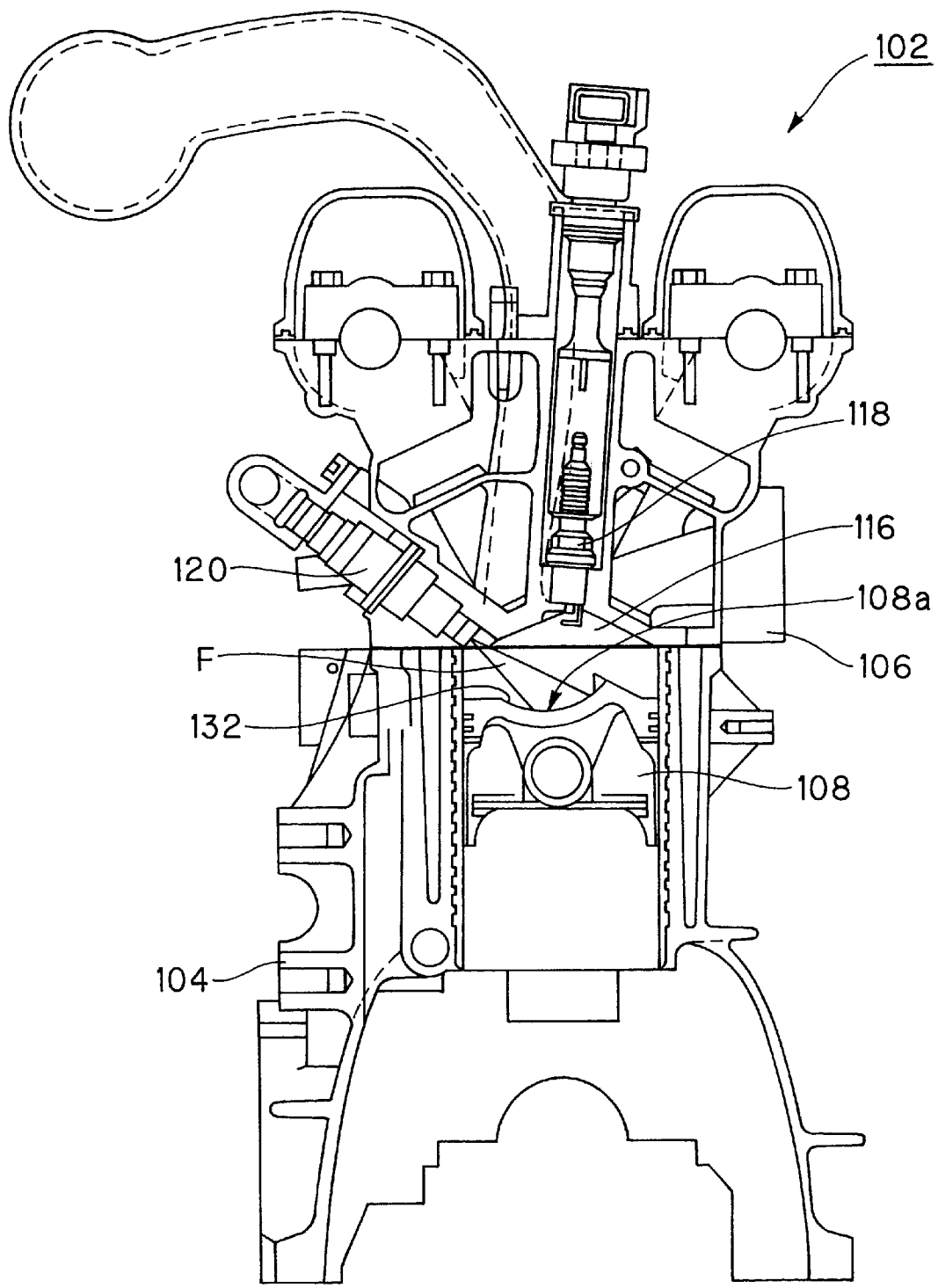
FIG. 28 is a cross-sectional view, illustrating the spark plug portion of the engine in a 45° crank angle (CA) BTDC state.
Figure 29:
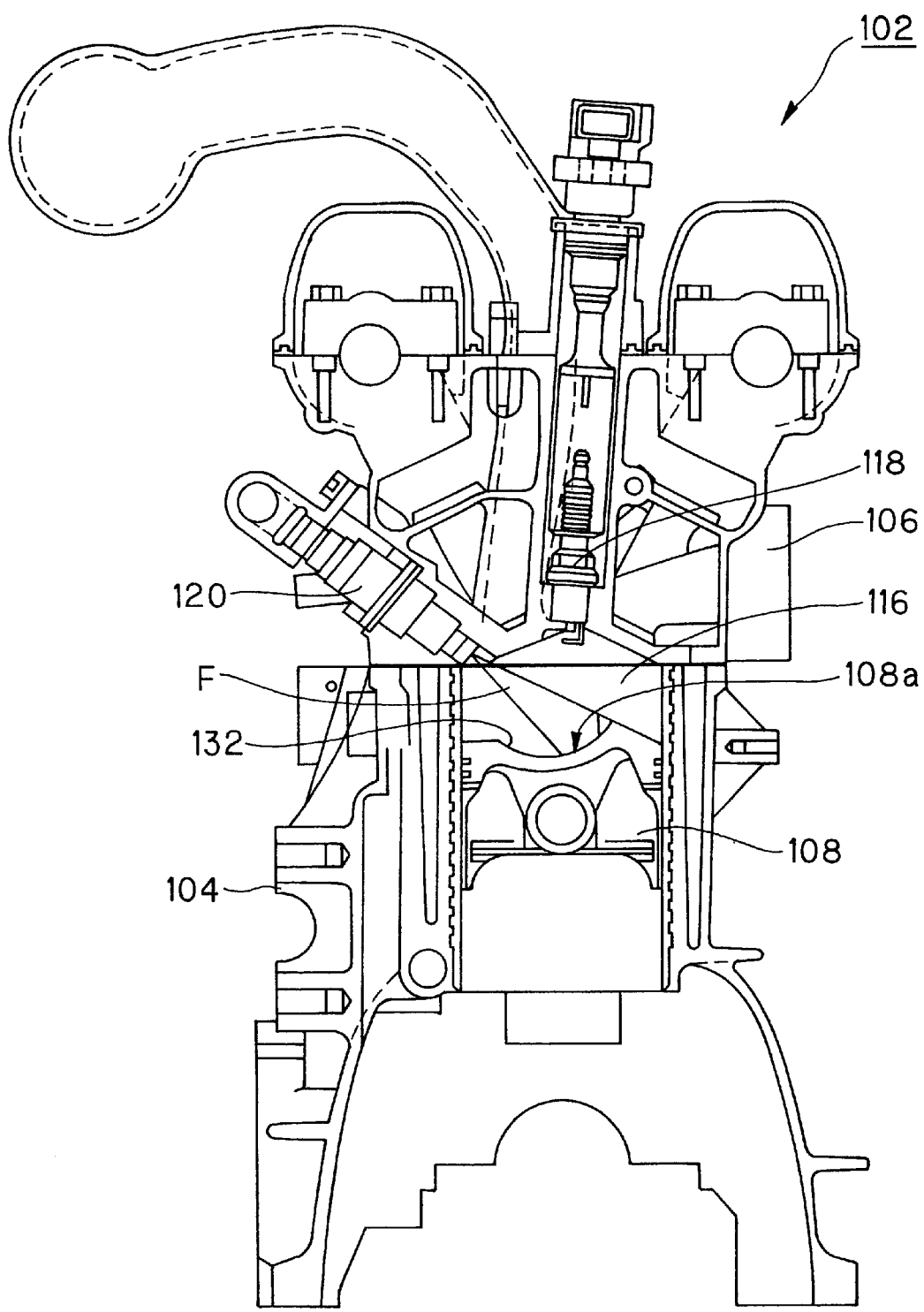
FIG. 29 is a cross-sectional view, illustrating the spark plug portion of the engine in a 60° crank angle (CA) BTDC state.
Figure 30:
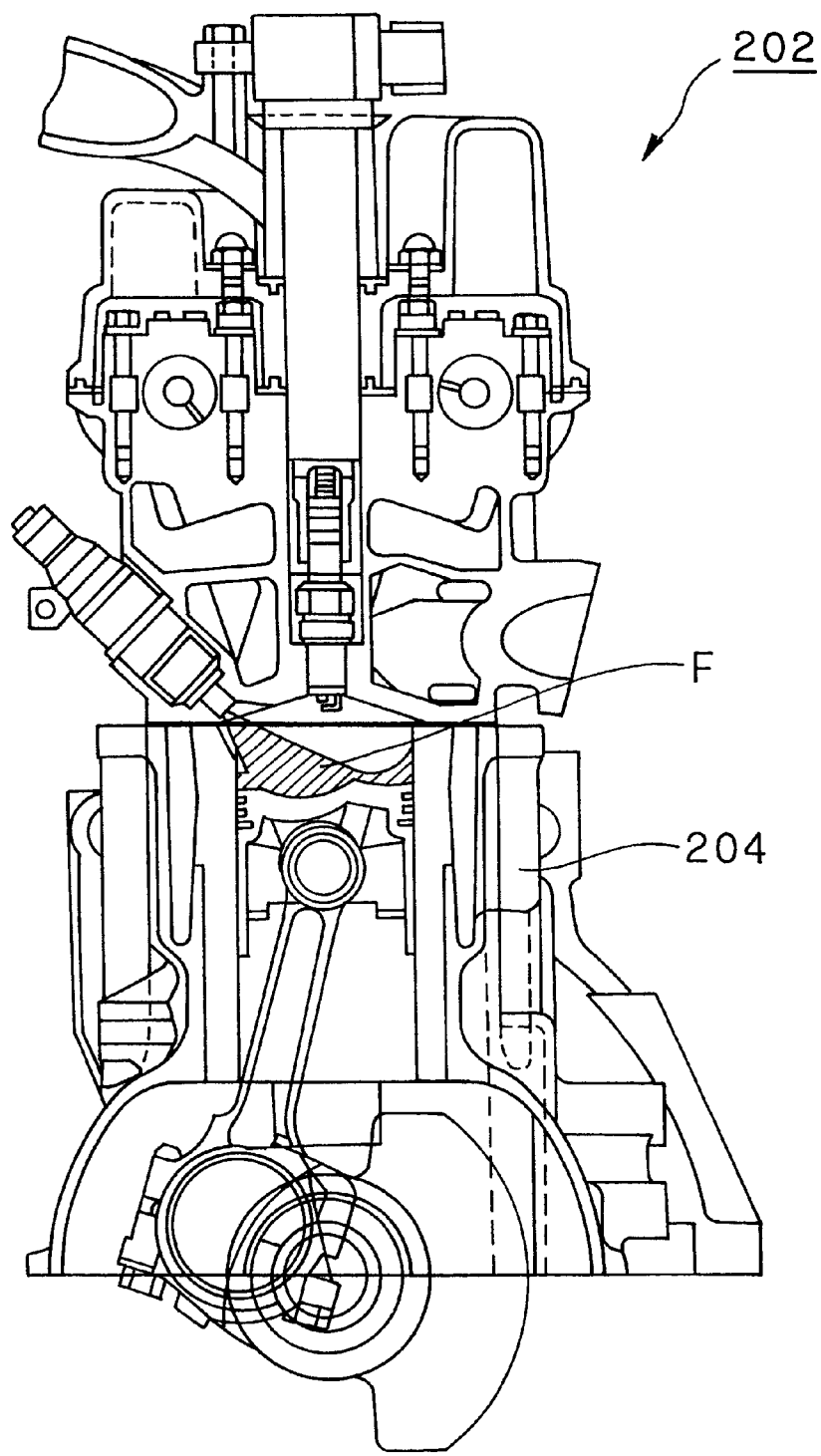
FIG. 30 is a cross-sectional view, showing a spark plug portion of a cylinder direct injection engine according to a second known construction, in which injection time of fuel from an injector is illustrated.
Figure 31:
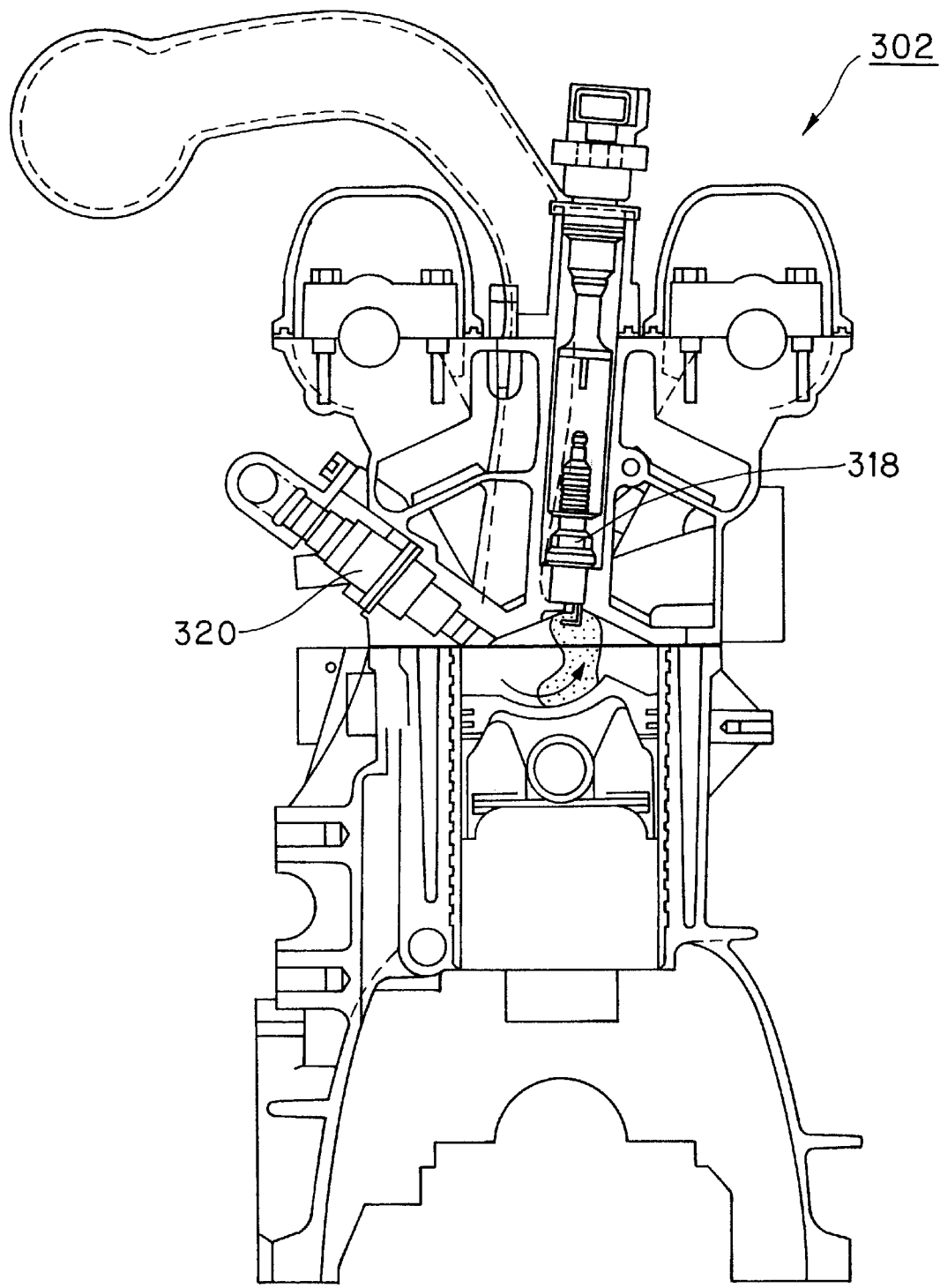
FIG. 31 is a cross-sectional view, showing a spark plug portion of a cylinder direct injection engine in which a tumble or swirl stream is illustrated.
Figure 32:
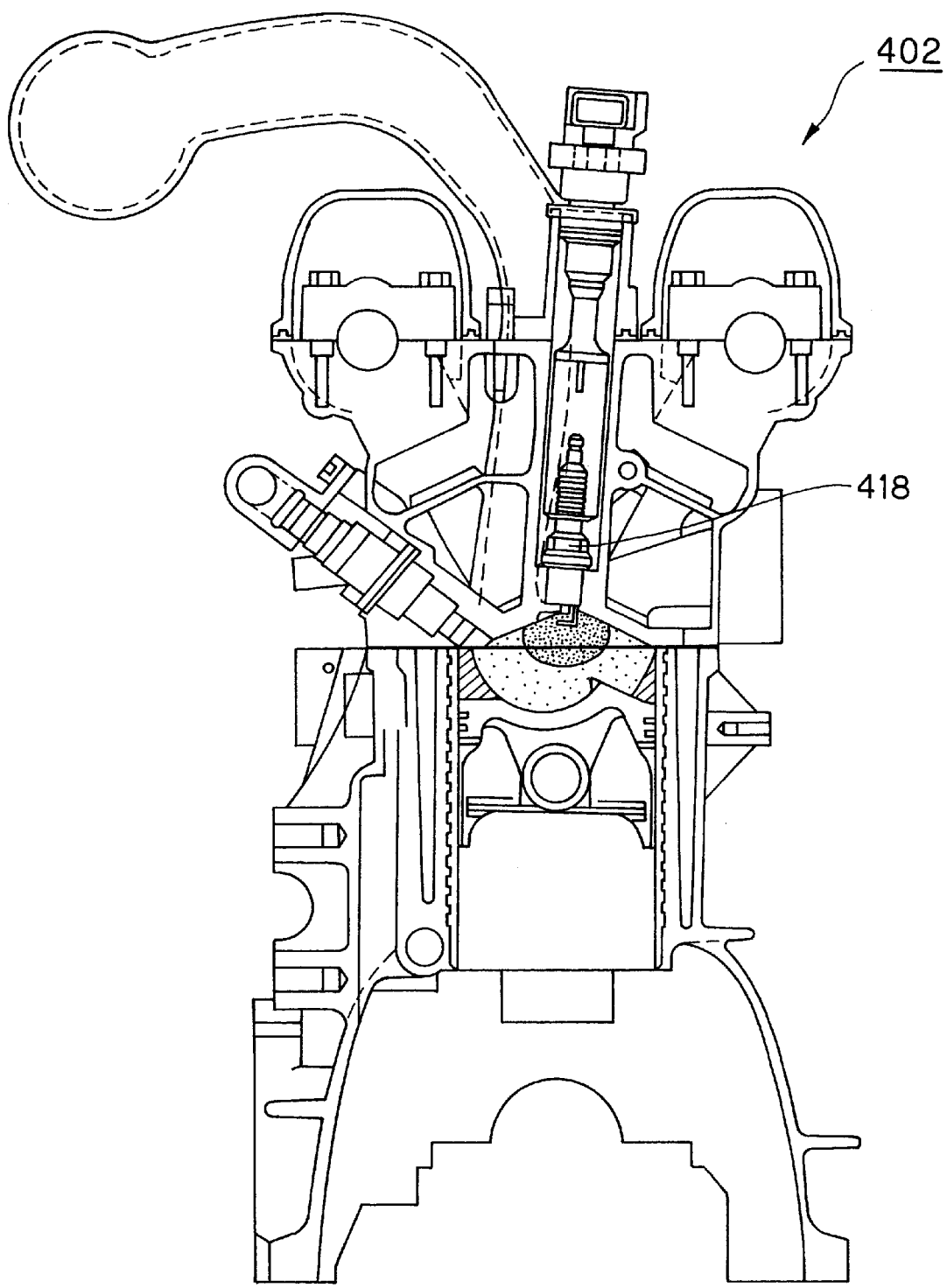
FIG. 32 is a cross-sectional view, illustrating a spark plug portion of a cylinder direct injection engine in which a stratified mixture is illustrated.
Figure 33:
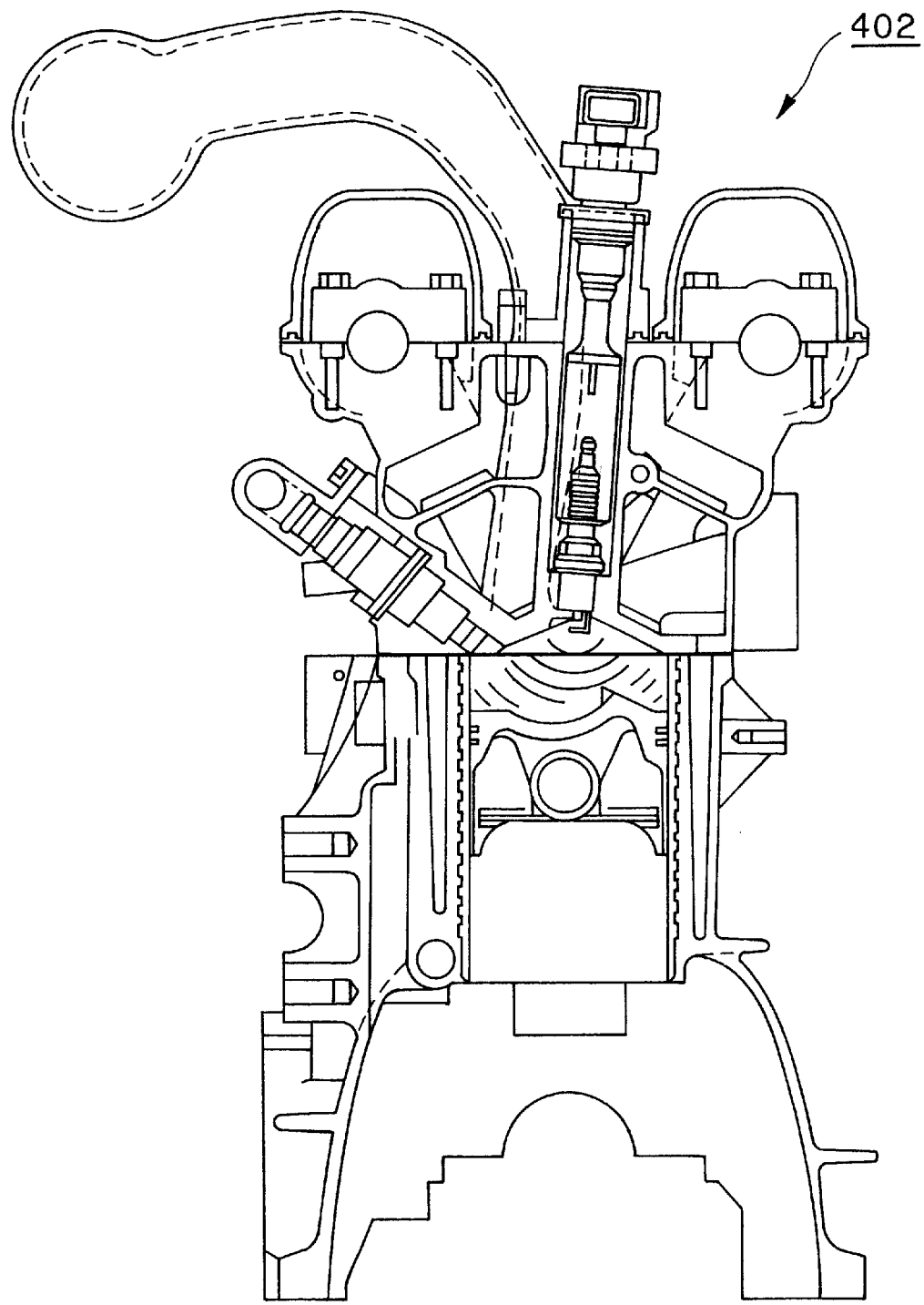
FIG. 33 is a cross-sectional view, illustrating the spark plug portion of the engine in which flame propagation is illustrated.

FIGS. 23–25 illustrate a third embodiment.

The third embodiment is characterized in that a cylinder bore 4C has a diameter which is set to be less than about 85 mm with respect to a cone angle in the range of about 15° to about 90° of fuel injected in the form of a conical stream from an injector 20 mounted on an engine 2.

More specifically, when the cone angle lies within the range of $15°<\theta\leq30°$, then the cylinder bore is less than 75 mm. When the cone angle falls within the ranges of $30°<\theta\leq45°$ and $45°<\theta\leq60°$, then the cylinder bore is less than 80 mm. When the cone angle is within the ranges of $60°<\theta\leq75°$ and $75°<\theta\leq90°$, then the cylinder bore is less than 85 mm.

As disclosed in the second embodiment, the piston stroke and the cylinder bore are correlated as a 50 mm to 80 mm piston stroke with a 50 mm to 92 mm cylinder bore.

In the engine 2 as illustrated in FIG. 23, fuel is injected in the form of a conical stream from the injector 20 at a 30° cone angle; a cylinder block 4 has a 70 mm cylinder bore; and, the injector 20 is installed at an angle of 45°.

As illustrated in FIG. 23, when atomized fuel "F" jets from the injector 20, then proper setting of the cylinder bore with reference to the cone angle permits fuel "F" to be sufficiently spread in a combustion chamber 16. When a spark plug 18 ignites, then a uniform mixture is formed in the combustion chamber 16, thereby providing stable combustion.

For example, as illustrated in FIGS. 24(a) and 24(b), a concave area 42 is formed at a top surface 8a of a piston 8. The concave area 42 includes a larger-sized first concave portion 42-1, and smaller-sized second and third concave portions 42-2, and 42-3. The first concave portion 42-1 is located on the intake side, while the portions 42-2 and 42-3 are situated on the exhaust side. The first concave portion 42-1 has a bottom surface 42a-1 which is oriented generally horizontally.

In conclusion, when the cone angle lies within the range of 15° to 90°, then the cylinder bore diameter is set to be less than 85 mm, thereby allowing fuel to be combusted in a stable manner. Such stable combustion can realize a variety of effects such as an improvement in fuel efficiency and respective reductions in torque variations, vibration, discharge volumes of THC (torque hydrocarbon), CO, and CO2, smoldering around the injector 20 and the spark plug 18, soot generation, and contamination of engine oil.

The present invention is not limited to the above-described first, second, and third embodiments, but is susceptible for various applications and variations or modifications.

For example, the engine having an intake port of a top entry type is employed in the third embodiment; alternatively, an engine having a side type intake port may be used.

In addition, although piston configurations are described in detail in the third embodiment, pistons of other types different from such disclosed piston patterns may be employed.

Further, the engine according to the above embodiments is constructed to establish one relationship between the cylinder bore and the piston stroke; another relationship among the cylinder bore, the piston stroke, and the stroke-bore ratio; yet another relationship between the cone angle and the cylinder bore. Alternatively, the engine may be specially configured to have the following relationships:

(1) One relationship between the piston stroke and the cone angle; and (2) Another relationship among the cylinder bore, the piston stroke, and the cone angle.

Thus, a wide variety of variations may be available. In addition, the engine incorporating such variations can readily be realized. This is advantageous in view of practical use.

Moreover, the engine may be specially structured by the step of carrying out the above various settings in view of the following: a degree to which the cone angle is widened in response to a change in an injector installation angle or a change in an injection force; and, ignition timing of the spark plug.

As a result, fine settings make it feasible to provide an ideal stratified mixture, with the consequential stable combustion. This is advantageous in view of practical use.

Furthermore, although the cylinder direct injection engine having a single injector disposed therein for each cylinder is disclosed in the above embodiments, there exists an alternative engine having two injectors for each cylinder. In this case, the above various settings may be reflected in such an alternative engine.

As amplified in the above description, one aspect of the present invention provides a cylinder direct injection engine including a spark plug positioned in a cylinder head at a substantially central portion of a combustion chamber, the combustion chamber being formed between the underside of the cylinder head and a top surface of a piston, intake and exhaust valves disposed in the cylinder head on respective opposite sides of the cylinder head, and an injector disposed in the cylinder head on one side of the cylinder head for injecting fuel in the form of a conical stream onto the top surface of the piston, the improvement wherein a difference in size between a piston stroke and a cylinder bore ranges from 0% to 4%, and the piston stroke is greater than the cylinder bore when the difference is unequal to 0%. This construction provides a reduced amount of displacement of the piston with respect to a crank rotational angle, and an ideal stratified fuel mixture during the compression stroke injection in a wider range. As a result, fuel can be combusted in a stable manner. In addition, such stable combustion can bring a variety of effects such as an improvement in fuel efficiency and respective reductions in torque variations, vibration, discharge volumes of THC (torque hydrocarbon) and CO, smoldering around the injector 20 and the spark plug 18, soot generation, and contamination of engine oil.

Another aspect of the present invention provides a cylinder direct injection engine including a spark plug positioned in a cylinder head at a substantially central portion of a combustion chamber, the combustion chamber being formed between the underside of the cylinder head and a top surface of a piston, intake and exhaust valves disposed in the cylinder head on respective opposite sides thereof, and an injector provided in the cylinder head on one side of the cylinder head for injecting fuel in the form of a conical stream onto the top surface of the piston, the improvement wherein the engine has a 50 mm to 80 mm piston stroke, a 50 mm to 92 mm cylinder bore, and a 0.8 to 1.4 stroke-bore ratio. Then, the engine thus constructed is possible to prevent scuffing, and thus to stabilize combustion. Further, the 80 mm or less piston stroke causes a variation rate of average effective pressure to be equal to or less than 5%. As a result, a satisfactorily stratified mixture is obtainable. In addition, the 50 mm or greater piston stroke allows the aforesaid variation rate to be equal to or less than 5%, and further permits a tumble or swirl stream to be produced to a sufficient level to convey fuel. As a result, a satisfactorily stratified mixture and thus stable combustion are provided. Moreover, the 50 mm or greater cylinder bore makes it feasible to reliably prevent scuffing, which otherwise would occur as a result of fuel adhering to a cylinder wall surface. In addition, the 92 mm or smaller cylinder bore allows the aforesaid variation rate to be equal to or less than 5%. As a result, a lean mixture in the combustion chamber 16 can properly be distributed therein, which results in stable combustion. Moreover, the 0.8 to 1.4 stroke-bore ratio allows the variation rate to be equal to or smaller than 5%, and further permits flame to be propagated in a substantially uniform manner in the combustion chamber 16. As a result, stable combustion is achievable.

A further aspect of the present invention provides a cylinder direct injection engine including a spark plug positioned in a cylinder head at a substantially central portion of a combustion chamber, the combustion chamber being formed between the underside of the cylinder head and a top surface of a piston, intake and exhaust valves disposed in the cylinder head on respective opposite sides thereof, and an injector provided in the cylinder head on one side of the cylinder head for injecting fuel in the form of a conical stream onto the top surface of the piston, the improvement wherein a cylinder bore is set to be less than 85 mm with respect to a 15° to 90° cone angle of fuel expelled in the form of the conical stream from the injector. This construction allows fuel to be combusted in a stable manner. Such stable combustion can realize a variety of effects such as an improvement in fuel efficiency and respective reductions in torque variations, vibration, discharge volumes of THC (torque hydrocarbon), CO, and CO2, smoldering around the injector 20 and the spark plug 18, soot generation, and contamination of engine oil.

Although a particular preferred embodiment of the invention has been disclosed in detail for illustrative purposes, it will be recognized that variations or modifications of the disclosed apparatus, including the rearrangement of parts, lie within the scope of the present invention.

What is claimed is:

1. In a cylinder direct injection engine including a spark plug positioned in a cylinder head at a substantially central portion of a combustion chamber, the combustion chamber being formed between the underside of the cylinder head and a top surface of a piston, intake and exhaust valves disposed in the cylinder head on respective opposite sides thereof, and an injector provided in the cylinder head on one side of the cylinder head for injecting fuel in the form of a conical stream onto the top surface of the piston, comprising the improvement wherein a difference in size between piston stroke length and cylinder bore diameter ranges from about 0% to about 4%, and the piston stroke length is greater than the cylinder bore diameter when the difference is unequal to 0%.

2. A cylinder direct injection engine as defined in claim 1, wherein the engine is configured to cover a range from one type in which the piston stroke length is equal to the cylinder bore diameter to another type of engine in which the piston stroke length is greater than the cylinder bore diameter by an amount of 4% or less.

3. A cylinder direct injection engine as defined in claim 1, wherein the engine is one of a square type in which the piston stroke length is equal to the cylinder bore diameter.

* * * * *